United States Patent
Liu et al.

(10) Patent No.: US 12,155,516 B2
(45) Date of Patent: Nov. 26, 2024

(54) REFERENCE SIGNAL DETERMINING METHOD AND APPARATUS

(71) Applicant: Huawei Technologies Co., Ltd., Shenzhen (CN)

(72) Inventors: Fengwei Liu, Chengdu (CN); Minghui Xu, Shenzhen (CN); Bo Huang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 301 days.

(21) Appl. No.: 17/849,336

(22) Filed: Jun. 24, 2022

(65) Prior Publication Data

US 2022/0337461 A1 Oct. 20, 2022

Related U.S. Application Data

(63) Continuation of application No. PCT/CN2019/129323, filed on Dec. 27, 2019.

(51) Int. Cl.
*H04L 27/26* (2006.01)
*H04L 5/00* (2006.01)

(52) U.S. Cl.
CPC ........ *H04L 27/2613* (2013.01); *H04L 5/0048* (2013.01)

(58) Field of Classification Search
CPC . H04L 27/2613; H04L 5/0048; H04L 5/0094; H04L 27/261; H04L 5/0051
See application file for complete search history.

(56) References Cited

U.S. PATENT DOCUMENTS

| | | | |
|---|---|---|---|
| 11,108,520 B2* | 8/2021 | Wu | ........................ H04L 27/26 |
| 2017/0214518 A1* | 7/2017 | Oh | .................... H04L 25/03012 |
| 2019/0222389 A1* | 7/2019 | Ko | ....................... H04L 27/2634 |

FOREIGN PATENT DOCUMENTS

| | | | | |
|---|---|---|---|---|
| CN | 108632009 A | | 10/2018 | |
| CN | 109314686 A | * | 2/2019 | ............... H04B 7/01 |
| CN | 109617665 A | | 4/2019 | |
| WO | 2019024664 A1 | | 2/1997 | |
| WO | 2018070767 A1 | | 4/2018 | |

OTHER PUBLICATIONS

Ericsson, "On phase tracking in DFT-S-OFDM waveform", 3GPP TSG-RAN WG1#87, R1-1612338, Nov. 14-18, 2016, 2 pages, Reno, USA.

* cited by examiner

*Primary Examiner* — Ayanah S George
(74) *Attorney, Agent, or Firm* — Slater Matsil, LLP

(57) ABSTRACT

This application discloses a reference signal determining method and an apparatus. The method includes a first device determines a first reference signal sequence in a reference signal sequence set. The first device maps the first reference signal sequence to a first symbol sequence, and sends a first reference signal corresponding to the first reference signal sequence to a second device based on the first symbol sequence. The first reference signal sequence is used by the second device to estimate impact of phase noise on a received signal, and the impact of the phase noise on the received signal includes at least one of inter-subcarrier interference, a common phase error, and the phase noise. The reference signal sequence set includes at least a first-type reference signal sequence. A time-domain amplitude variance and a frequency-domain amplitude variance of the first-type reference signal sequence each meet a preset threshold.

19 Claims, 13 Drawing Sheets

□ Data  ▨ ZP-PTRS

REFERENCE SIGNAL DETERMINING METHOD AND APPARATUS

CROSS-REFERENCE TO RELATED APPLICATIONS

This application is a continuation of International Application No. PCT/CN2019/129323, filed on Dec. 27, 2019, the disclosure of which is hereby incorporated by reference in its entirety.

TECHNICAL FIELD

This application relates to the field of communication technologies, and in particular, to a reference signal determining method and an apparatus.

BACKGROUND

In a new generation wireless communication network (for example, a 5th generation mobile communication technology (5G) or 6th generation mobile communication technology (6G) communication network), an operating band of a communication system is above 6 GHz, for example, 28 GHz, 39 GHz, 60 GHz, or 73 GHz. Therefore, the new generation wireless communication network has a significant feature of a high frequency communication system, so that a high throughput can be easily implemented. However, compared with a phase noise level of an existing wireless communication network, a phase noise level of the new generation wireless communication network operating within a range above 6 GHz deteriorates at a level of 20×log 10(f1/f2) as the operating band increases, where both f1 and f2 are carrier frequencies. That is, a phase noise power spectral density of the band f1 is 20×log 10(f1/f2) dB higher than a phase noise power spectral density of the band f2. A 2 GHz band and a 28 GHz band are used as an example. A phase noise level of the 28 GHz band is 23 dB higher than that of the 2 GHz band. A higher phase noise level indicates a larger phase error caused by a common phase error (CPE) to a transmitted signal.

In an existing technology, a demodulation reference signal (DMRS) and a phase compensation reference signal (PCRS) are jointly used for channel estimation, phase noise estimation, and data demodulation in both uplink and downlink, so that phase noise error compensation is performed based on estimated phase noise, to improve communication quality. The PCRS may also be referred to as a phase tracking reference signal (PTRS). For ease of description, PTRS is used for description hereinafter. When a modulation and coding scheme (MCS) is greater than an MCS threshold corresponding to the MCS, inter-subcarrier interference increases significantly, significantly increasing demodulation or decoding difficulties. Therefore, estimation on and compensation for the inter-subcarrier interference (ICI) need to be considered during higher-order modulation.

In an existing ICI estimation method, a matrix is mainly constructed by using a received signal of a resource element (RE) on which the PTRS is located, or by combining a received signal of an RE near the RE on which the PTRS is located, and an estimated ICI value is obtained through matrix inversion and based on a transmit signal of the reference signal. The PTRS used in the existing ICI estimation is usually a symbol that is modulated through quadrature phase shift keying (QPSK) and mapped to frequency domain. In this case, if phase noise is poor or a channel is not flat, estimation of inter-subcarrier interference is easily inaccurate.

SUMMARY

This application provides a reference signal determining method and an apparatus, to resolve a problem that estimation of phase noise is inaccurate in an existing technology.

According to a first aspect, a first device determines a first reference signal sequence in a reference signal sequence set, where the first reference signal sequence is used by a second device to estimate impact of phase noise on a received signal, and the impact of the phase noise on the received signal includes at least one of inter-subcarrier interference, a common phase error, and the phase noise. The reference signal sequence set includes at least a first-type reference signal sequence, and a time-domain amplitude variance and a frequency-domain amplitude variance of the first-type reference signal sequence each meet a preset threshold. The first device maps the first reference signal sequence to a first symbol sequence, and sends a first reference signal corresponding to the first reference signal sequence to the second device.

According to the foregoing method, the first device determines the first reference signal sequence in the reference signal sequence set. The first-type reference signal sequence in the reference signal sequence set may have the time-domain amplitude variance and the frequency-domain amplitude variance that are each less than the preset threshold, so that the determined first reference signal sequence has stable amplitude responses in both frequency domain and time domain. This resolves a problem in an existing technology that a time-domain amplitude characteristic of a PTRS sequence for orthogonal frequency division multiplexing (OFDM) fluctuates randomly after the sequence is transformed into frequency domain, and a reference signal sequence cannot resist severe channel frequency selectivity, so that precision of phase noise estimation is improved.

In a possible design, the first device determines the first reference signal sequence in the reference signal sequence set based on a first parameter, where the first parameter includes at least one of a hardware capability of the first device and/or a hardware capability of the second device, a parameter for transmission between the first device and the second device, and a phase tracking reference signal PTRS parameter of the second device.

According to the foregoing method, the first device may determine, based on the first parameter, a transmission scenario in which the first device and the second device are located, and may flexibly determine, based on the first parameter, a reference signal sequence suitable for the scenario, so that the precision of phase noise estimation is effectively improved.

In a possible design, the reference signal sequence set includes a pi/2 binary phase shift keying (BPSK) reference signal sequence based on Golay Golay complementary sequences. The first device determines, if determining that the first parameter meets the following condition, that the first reference signal sequence is the pi/2 BPSK reference signal sequence based on the Golay complementary sequences: a size of a PTRS chunk is $2^a \times 10^b \times 26^c$, or a size of a corresponding chunk that is in a PTRS chunk and that is for carrying a valid sequence of the first reference signal sequence is $2^a \times 10^b \times 26^c$, where a, b, and c are integers.

According to the foregoing method, when the size of the PTRS chunk is $2^a \times 10^b \times 26^c$ or the size of the corresponding PTRS chunk used for the valid sequence is $2^a \times 10^b \times 26^c$, the first device may select, based on a PTRS pattern determined by using the first parameter, the pi/2 BPSK reference signal sequence based on the Golay complementary sequences as the first reference signal sequence, so that a selected PTRS may have stable amplitude responses in both frequency domain and time domain. This effectively improves the precision of phase noise estimation.

In a possible design, the reference signal sequence set includes a ZC sequence. The first device determines, if determining that the first parameter meets the following condition, that the first reference signal sequence is the ZC sequence: a size of a PTRS chunk is a prime number, or a size of a chunk that is in a PTRS chunk and that is for carrying a valid sequence of the first reference signal sequence is a prime number.

According to the foregoing method, when the size of the PTRS chunk is a prime number or the size of the corresponding PTRS chunk used for the valid sequence is a prime number, the first device may select, based on a PTRS pattern determined by using the first parameter, the ZC sequence as the first reference signal sequence, so that a selected PTRS may have stable amplitude responses in both frequency domain and time domain. This effectively improves the precision of phase noise estimation.

In a possible design, the reference signal sequence set includes a frequency-domain QPSK sequence with a stable amplitude in time domain and/or a time-domain QPSK sequence with a stable amplitude in frequency domain, where the frequency-domain QPSK sequence with the stable amplitude in time domain is one of P1 reference sequences that are selected from a frequency-domain QPSK sequence set based on a length Q of a valid sequence and whose time-domain amplitude variances meet a second threshold, and the time-domain QPSK sequence with the stable amplitude in frequency domain is one of P2 reference sequences that are selected from a time-domain QPSK sequence set based on the length Q of the valid sequence and whose frequency-domain amplitude variances meet a third threshold, where P1 and P2 are positive integers. The first device determines, if determining that the first parameter meets the following condition, that the first reference signal sequence is the frequency-domain QPSK sequence with the stable amplitude in time domain and/or the time-domain QPSK sequence with the stable amplitude in frequency domain, a size M of a PTRS chunk included in a pattern of the first reference signal is greater than or equal to a first threshold, or a size M of a corresponding chunk that is included in a PTRS chunk included in a pattern of the first reference signal and that is for carrying a valid sequence of the first reference signal sequence is greater than or equal to a first threshold, and/or M is an integer multiple of L, where L is a quantity of resource elements REs included in one resource block (RB), and M and L are positive integers.

According to the foregoing method, when the size of the PTRS chunk is greater than the first threshold, the first device may select, based on a PTRS pattern determined by using the first parameter, a reference signal sequence with a stable amplitude in time domain or frequency domain as the first reference signal sequence, so that a selected PTRS may meet a requirement of phase noise estimation on the reference signal sequence when the size of the PTRS chunk is large. This effectively improves the precision of phase noise estimation.

In a possible design, the first device determines a power boosting value of the second device based on the size of the PTRS chunk in the pattern of the first reference signal, or the first device determines that the power boosting value of the second device is a fixed value.

According to the foregoing method, the first device may improve the precision of phase noise estimation by properly increasing power based on a feature of a current transmission environment and when the first device and the second device are capable of parsing the first reference signal.

In a possible design, the reference signal sequence set further includes a second-type reference signal sequence, and the second-type reference signal sequence is a discrete reference signal sequence. The first device determines a second reference signal sequence in the second-type reference signal sequence based on the first parameter, where the second reference signal sequence is used by the second device to estimate impact of phase noise on a received signal, and the impact of the phase noise on the received signal includes at least one of inter-subcarrier interference, a common phase error, and the phase noise. The first device maps the second reference signal sequence to a second symbol sequence, and sends a second reference signal corresponding to the second reference signal sequence to the second device, where a size of a PTRS chunk included in a pattern of the second reference signal sequence is 1, and the first parameter further includes at least one of a pattern of the second reference signal, an MCS threshold used to determine the pattern of the second reference signal, and a bandwidth threshold used to determine the pattern of the second reference signal.

According to the foregoing method, when the size of the PTRS chunk is equal to 1, the first device may select, based on a PTRS pattern determined by using the first parameter, a discrete reference signal sequence as the first reference signal sequence, so that a selected PTRS may meet a requirement of phase noise estimation on the reference signal sequence when a channel condition is poor. This effectively improves the precision of phase noise estimation.

In a possible design, a power boosting value of the second reference signal sequence is determined based on an MCS of the second device, or the power boosting value of the second device is a fixed value.

In a possible design, if the first device determines that the MCS of the second device is greater than or equal to a first MCS threshold, the power boosting value of the second device is 0 dB, or if the first device determines that the MCS of the second device is less than a first MCS threshold, the power boosting value of the second device is determined based on a quantity of DMRS ports associated with a PTRS port of the second device.

In a possible design, if the first device determines that the MCS of the second device is greater than a first MCS threshold, the power boosting value of the second device is 0 dB, or if the first device determines that the MCS of the second device is less than or equal to a first MCS threshold, the power boosting value of the second device is determined based on a quantity of DMRS ports associated with a PTRS port.

According to the foregoing method, the first device may improve the precision of phase noise estimation by properly increasing power based on a feature of a current transmission environment, for example, a case in which a channel condition is poor, and when the first device and the second device are capable of parsing the second reference signal.

In a possible design, the first device determines the first reference signal sequence based on an association relationship between the first parameter and the first reference signal sequence, or the first device determines the second reference signal sequence based on an association relationship between the first parameter and the second reference signal sequence.

According to the foregoing method, complexity of determining the first reference signal sequence or the second reference signal sequence by the first device by using the first parameter can be reduced.

In a possible design, the first device sends indication information of the first reference signal sequence to the second device, where the indication information indicates the first reference signal sequence, or the first device sends indication information of the second reference signal sequence to the second device, where the indication information indicates the second reference signal sequence.

According to the foregoing method, complexity and consistency of determining the first reference signal sequence or the second reference signal sequence by the first device and the second device by using the first parameter can be ensured.

According to a second aspect, an embodiment of this application provides a communication apparatus. The communication apparatus (briefly referred to as an apparatus below) has a function of implementing steps performed by the first device in the method instance in the first aspect. The apparatus may be located in the first device, and the first device may be a network device or a terminal device. The function may be implemented by using hardware, or may be implemented by using hardware executing corresponding software. The hardware or software includes one or more modules corresponding to the foregoing function. In a possible implementation, a structure of the apparatus includes a processing unit and a transceiver unit. The units may perform corresponding steps or functions performed by the first device in the method example in the first aspect, and include the transceiver unit and the processing unit. The processing unit is configured to determine a first reference signal sequence in a reference signal sequence set, where the first reference signal sequence is used by a second device to estimate impact of phase noise on a received signal, and the impact of the phase noise on the received signal includes at least one of inter-subcarrier interference, a common phase error, and the phase noise, the reference signal sequence set includes at least a first-type reference signal sequence, and a time-domain amplitude variance or a frequency-domain amplitude variance of the first-type reference signal sequence meets a preset threshold. The transceiver unit is configured to map the first reference signal sequence to a first symbol sequence, and send a first reference signal corresponding to the first reference signal sequence to the second device.

In a possible design, the processing unit is specifically configured to determine the first reference signal sequence in the reference signal sequence set based on a first parameter, where the first parameter includes at least one of a parameter for transmission between the first device and the second device, and a pattern of the first reference signal.

In a possible design, the reference signal sequence set includes a pi/2 BPSK reference signal sequence based on Golay complementary sequences. The processing unit is specifically configured to determine, if determining that the first parameter meets the following condition, that the first reference signal sequence is the pi/2 BPSK reference signal sequence based on the Golay complementary sequences: a size of a PTRS chunk is $2^a \times 10^b \times 26^c$, or a size of a corresponding chunk that is in a PTRS chunk and that is for carrying a valid sequence of the first reference signal sequence is $2^a \times 10^b \times 26^c$, where a, b, and c are integers.

In a possible design, the reference signal sequence set includes a ZC sequence. The processing unit is specifically configured to determine, if determining that the first parameter meets the following condition, that the first reference signal sequence is the ZC sequence: a size of a PTRS chunk is a prime number, or a size of a chunk that is in a PTRS chunk and that is for carrying a valid sequence of the first reference signal sequence is a prime number.

In a possible design, the reference signal sequence set includes a frequency-domain QPSK sequence with a stable amplitude in time domain and/or a time-domain QPSK sequence with a stable amplitude in frequency domain, where the frequency-domain QPSK sequence with the stable amplitude in time domain is one of P1 reference sequences that are selected from a frequency-domain QPSK sequence set based on a length Q of a valid sequence and whose time-domain amplitude variances meet a second threshold, and the time-domain QPSK sequence with the stable amplitude in frequency domain is one of P2 reference sequences that are selected from a time-domain QPSK sequence set based on the length Q of the valid sequence and whose frequency-domain amplitude variances meet a third threshold, where P1 and P2 are positive integers.

The processing unit is specifically configured to determine, if determining that the first parameter meets the following condition, that the first reference signal sequence is the frequency-domain QPSK sequence with the stable amplitude in time domain and/or the time-domain QPSK sequence with the stable amplitude in frequency domain: a size M of a PTRS chunk included in the pattern of the first reference signal is greater than or equal to a first threshold, or a size M of a corresponding chunk that is in a PTRS chunk included in the pattern of the first reference signal and that is for carrying a valid sequence of the first reference signal sequence is greater than or equal to a first threshold, where M and L are positive integers.

In a possible design, the processing unit is further configured to, if determining that the first reference signal sequence is a block non-zero power sequence, determine a power boosting value of the second device based on the size of the PTRS chunk in the pattern of the first reference signal, or the processing unit is further configured to determine that a power boosting value of the first reference signal sequence is a fixed value.

In a possible design, the reference signal sequence set further includes a second-type reference signal sequence, and the second-type reference signal sequence is a discrete reference signal sequence. The processing unit is further configured to determine a second reference signal sequence in the second-type reference signal sequence based on the first parameter, where a size of a PTRS chunk included in a pattern of the second reference signal sequence is 1, the second reference signal sequence is used by the second device to estimate impact of phase noise on a received signal, and the impact of the phase noise on the received signal includes inter-subcarrier interference and/or a common phase error and/or the phase noise.

The transceiver unit is further configured to map the second reference signal sequence to a second symbol sequence, and send a second reference signal corresponding to the second reference signal sequence to the second device, where the first parameter further includes at least one of a pattern of the second reference signal, an MCS threshold used to determine the pattern of the second reference signal, and a bandwidth threshold used to determine the pattern of the second reference signal.

In a possible design, the processing unit is further configured to determine the power boosting value of the second device based on an MCS of the second device.

In a possible design, the processing unit is specifically configured to, if determining that the MCS of the second device is greater than or equal to a first MCS threshold, determine that the power boosting value of the second device is 0 dB, or if determining that the MCS of the second device is less than a first MCS threshold, determine the power boosting value of the second device based on a quantity of DMRS ports associated with a PTRS port of the second device.

In a possible design, the processing unit is specifically configured to, if determining that the MCS of the second device is greater than a first MCS threshold, determine that the power boosting value of the second device is 0 dB, or if determining that the MCS of the second device is less than or equal to a first MCS threshold, determine the power boosting value of the second device based on a quantity of DMRS ports associated with a PTRS port of the second device.

In a possible design, the processing unit is further configured to determine the first reference signal sequence based on an association relationship between the first parameter and the first reference signal sequence, or determine the second reference signal sequence based on an association relationship between the first parameter and the second reference signal sequence.

In a possible design, the transceiver unit is further configured to, send indication information of the first reference signal sequence to the second device, where the indication information indicates the first reference signal sequence, or send indication information of the second reference signal sequence to the second device, where the indication information indicates the second reference signal sequence.

According to a third aspect, an embodiment of this application provides a reference signal determining method. A second device determines a first reference signal sequence in a reference signal sequence set, where the reference signal sequence set includes at least a first-type reference signal sequence, and a time-domain amplitude variance and a frequency-domain amplitude variance of the first-type reference signal sequence each meet a preset threshold. The second device receives a first reference signal from a first device, and demaps the first reference signal based on a first symbol sequence to which the first reference signal sequence is mapped, to obtain a received signal of the first reference signal sequence, where the received signal of the first reference signal sequence and the first reference signal sequence are used by the second device to estimate impact of phase noise on the received signal, and the impact of the phase noise on the received signal includes at least one of inter-subcarrier interference, a common phase error, and the phase noise.

According to the foregoing method, the second device may determine the first reference signal sequence in the reference signal sequence set. The first-type reference signal sequence in the reference signal sequence set may have the time-domain amplitude variance and the frequency-domain amplitude variance that are each less than the preset threshold, so that the determined first reference signal sequence has stable amplitude responses in both frequency domain and time domain. This resolves a problem in an existing technology that a time-domain amplitude characteristic of a PTRS sequence for OFDM fluctuates randomly after the sequence is transformed in frequency domain, and a reference signal sequence cannot resist severe channel frequency selectivity, so that precision of phase noise estimation is improved.

In a possible design, the second device determines the first reference signal sequence in the reference signal sequence set based on a first parameter, where the first parameter includes at least one of a hardware capability of the first device and/or a hardware capability of the second device, a parameter for transmission between the first device and the second device, and a phase tracking reference signal PTRS parameter of the second device.

According to the foregoing method, the second device may determine, based on a transmission scenario in which the first device and the second device are located and that is determined by using the first parameter, a reference signal sequence suitable for the scenario, so that the precision of phase noise estimation can be ensured in different scenarios.

In a possible design, the reference signal sequence set includes a pi/2 BPSK reference signal sequence based on Golay complementary sequences. The second device determines, if determining that the first parameter meets the following condition, that the first reference signal sequence is the pi/2 BPSK reference signal sequence based on the Golay complementary sequences: a size of a PTRS chunk is $2^a \times 10^b \times 26^c$, or a size of a corresponding chunk that is in a PTRS chunk and that is for carrying a valid sequence of the first reference signal sequence is $2^a \times 10^b \times 26^c$, where a, b, and c are integers.

According to the foregoing method, when the size of the PTRS chunk is $2^a \times 10^b \times 26^c$ or the size of the corresponding PTRS chunk used for the valid sequence is $2^a \times 10^b \times 26^c$, the second device may determine, based on a PTRS pattern determined by using the first parameter, the pi/2 BPSK reference signal sequence based on the Golay complementary sequences as the first reference signal sequence, so that a determined PTRS may have stable amplitude responses in both frequency domain and time domain. This effectively ensures the precision of phase noise estimation.

In a possible design, the reference signal sequence set includes a ZC sequence. The second device determines, if determining that the first parameter meets the following condition, that the first reference signal sequence is the ZC sequence: a size of a PTRS chunk is a prime number, or a size of a chunk that is in a PTRS chunk and that is for carrying a valid sequence of the first reference signal sequence is a prime number.

According to the foregoing method, when the size of the PTRS chunk is a prime number or the size of the corresponding PTRS chunk used for the valid sequence is a prime number, the second device may determine, based on a PTRS pattern determined by using the first parameter, the ZC sequence as the first reference signal sequence, so that a determined PTRS may have stable amplitude responses in both frequency domain and time domain. This effectively ensures the precision of phase noise estimation.

In a possible design, the reference signal sequence set includes a frequency-domain QPSK sequence with a stable amplitude in time domain and/or a time-domain QPSK sequence with a stable amplitude in frequency domain, where the frequency-domain QPSK sequence with the stable amplitude in time domain is one of P1 reference sequences that are selected from a frequency-domain QPSK sequence set based on a length Q of a valid sequence and whose time-domain amplitude variances meet a second threshold, and the time-domain QPSK sequence with the stable amplitude in frequency domain is one of P2 reference sequences that are selected from a time-domain QPSK sequence set based on the length Q of the valid sequence and whose frequency-domain amplitude variances meet a third threshold, where P1 and P2 are positive integers. The second device determines, if determining that the first parameter meets the following condition, that the first reference signal sequence is the frequency-domain QPSK sequence with the stable amplitude in time domain and/or the time-domain QPSK sequence with the stable amplitude in frequency domain: a size M of a PTRS chunk included in a pattern of the first reference signal is greater than or equal to a first threshold, or a size M of a corresponding chunk that is included in a PTRS chunk included in a pattern of the first reference signal and that is for carrying a valid sequence of the first reference signal sequence is greater than or equal to a first threshold, where M and L are positive integers.

According to the foregoing method, when the size of the PTRS chunk is greater than the first threshold, the second device may determine, based on a PTRS pattern determined by using the first parameter, a reference signal sequence with a stable amplitude in time domain or frequency domain as the first reference signal sequence, so that a determined PTRS may meet a requirement of phase noise estimation on the reference signal sequence when the size of the PTRS chunk is large. This effectively improves the precision of phase noise estimation.

In a possible design, the second device determines a power boosting value of the second device based on the size of the PTRS chunk in the pattern of the first reference signal, or the second device determines that the power boosting value of the second device is a fixed value.

According to the foregoing method, the second device may determine, based on a feature of a current transmission environment, a power boosting value of the first reference signal sequence, to effectively parse the first reference signal, so that the precision of phase noise estimation is improved.

In a possible design, the reference signal sequence set further includes a second-type reference signal sequence, and the second-type reference signal sequence is a discrete reference signal sequence. The second device determines a second reference signal sequence in the second-type reference signal sequence based on the first parameter, where the second reference signal sequence is used by the second device to estimate impact of phase noise on a received signal, and the impact of the phase noise on the received signal includes inter-subcarrier interference and/or a common phase error and/or the phase noise. The second device receives a second reference signal from the first device, and demaps the second reference signal based on a second symbol sequence to which the second reference signal sequence is mapped, to obtain a received signal of the second reference signal sequence, where a size of a PTRS chunk included in a pattern of the second reference signal sequence is 1, and the first parameter further includes at least one of a pattern of the second reference signal, an MCS threshold used to determine the pattern of the second reference signal, and a bandwidth threshold used to determine the pattern of the second reference signal.

According to the foregoing method, when the size of the PTRS chunk is equal to 1, the second device may determine, based on a PTRS pattern determined by using the first parameter, a discrete reference signal sequence as the first reference signal sequence, so that a selected PTRS may effectively parse the first reference signal when a channel condition is poor. This improves the precision of phase noise estimation.

In a possible design, the second device determines the power boosting value of the second device based on an MCS of the second device, or the second device determines that the power boosting value of the second device is a fixed value.

In a possible design, if determining that the MCS of the second device is greater than or equal to a first MCS threshold, the second device determines that the power boosting value is 0 dB, or if determining that the MCS of the second device is less than a first MCS threshold, the second device determines the power boosting value based on a quantity of demodulation reference signal DMRS ports associated with a phase noise estimation reference signal PTRS port.

In a possible design, if determining that the MCS of the second device is greater than a first MCS threshold, the second device determines that the power boosting value is 0 dB, and if determining that the MCS of the second device is less than or equal to a first MCS threshold, the second device determines the power boosting value based on a quantity of demodulation reference signal DMRS ports associated with a phase noise estimation reference signal PTRS port.

According to the foregoing method, the second device may determine, based on a feature of a current transmission environment, a power boosting value selected by the first device, to improve the precision of phase noise estimation.

In a possible design, the first parameter includes at least one of a phase noise model of the first device and/or a phase noise model the second device, a phase noise power spectral density of the first device and/or a phase noise power spectral density of the second device, a subcarrier spacing, a carrier frequency, a bandwidth of the second device, the modulation and coding scheme MCS of the second device, a modulation order of the second device, a parameter of a channel between the first device and the second device, the pattern of the first reference signal, an MCS threshold used to determine the pattern of the first reference signal, and a bandwidth threshold used to determine the pattern of the first reference signal.

In a possible design, the first reference signal sequence is one of a QPSK pseudo-random sequence, a block sequence including a cyclic prefix and a cyclic suffix, a DMRS sequence, a block zero power sequence, a ZC sequence, and a block non-zero power sequence.

In a possible design, the second device determines the first reference signal sequence based on an association relationship between the first parameter and the first reference signal sequence, or the second device determines the second reference signal sequence based on an association relationship between the first parameter and the second reference signal sequence.

According to the foregoing method, complexity of determining the first reference signal sequence or the second reference signal sequence by the second device by using the first parameter can be reduced, content sent by using signaling can be reduced, and transmission resources occupied by the signaling can be reduced.

In a possible design, the second device receives indication information of the first reference signal sequence from the second device, where the indication information indicates the first reference signal sequence, or the second device receives indication information of the second reference signal sequence from the second device, where the indication information indicates the second reference signal sequence.

According to the foregoing method, complexity of determining the first reference signal sequence or the second reference signal sequence by the second device can be ensured, and both the first device and the second device can be ensured to select a consistent first reference signal sequence or second reference signal sequence for the second device to perform phase noise estimation.

According to a fourth aspect, an embodiment of this application provides a communication apparatus. The apparatus has a function of implementing behavior in the method instance in the third aspect. The apparatus may be located in a second device, and the second device may be a network device or a terminal device. The function may be implemented by using hardware, or may be implemented by using hardware executing corresponding software. The hardware or software includes one or more modules corresponding to the foregoing function. In a possible design, a structure of the apparatus includes a processing unit and a transceiver unit. The units may perform corresponding steps or functions in the method example in the third aspect, and includes the processing unit and the transceiver unit. The transceiver unit is configured to receive a first reference signal from a first device. The processing unit is configured to determine a first reference signal sequence in a reference signal sequence set, and demap the first reference signal based on a first symbol sequence to which the first reference signal sequence is mapped, to obtain a received signal of the first reference signal sequence, where the reference signal sequence set includes at least a first-type reference signal sequence, a time-domain amplitude variance or a frequency-domain amplitude variance of the first-type reference signal sequence meets a preset threshold, the received signal of the first reference signal sequence is used by the communication apparatus to estimate impact of phase noise on the received signal, and the impact of the phase noise on the received signal includes at least one of inter-subcarrier interference, a common phase error, and the phase noise.

In a possible design, the processing unit is specifically configured to determine the first reference signal sequence in the reference signal sequence set based on a first parameter, where the first parameter includes at least one of a parameter for transmission between the first device and the communication apparatus, and a pattern of the first reference signal.

In a possible design, the reference signal sequence set includes a pi/2 BPSK reference signal sequence based on Golay complementary sequences. The processing unit is specifically configured to determine, if determining that the first parameter meets the following condition, that the first reference signal sequence is the pi/2 BPSK reference signal sequence based on the Golay complementary sequences: a size of a PTRS chunk is $2^a \times 10^b \times 26^c$, or a size of a corresponding chunk that is in a PTRS chunk and that is for carrying a valid sequence of the first reference signal sequence is $2^a \times 10^b \times 26^c$.

In a possible design, the reference signal sequence set includes a ZC sequence. The processing unit is specifically configured to determine, if determining that the first parameter meets the following condition, that the first reference signal sequence is the ZC sequence: a size of a PTRS chunk is a prime number, or a size of a chunk that is in a PTRS chunk and that is for carrying a valid sequence of the first reference signal sequence is a prime number.

In a possible design, the reference signal sequence set includes a frequency-domain QPSK sequence with a stable amplitude in time domain and/or a time-domain QPSK sequence with a stable amplitude in frequency domain, where the frequency-domain QPSK sequence with the stable amplitude in time domain is one of P1 reference sequences that are selected from a frequency-domain QPSK sequence set based on a length Q of a valid sequence and whose time-domain amplitude variances meet a second threshold, and the time-domain QPSK sequence with the stable amplitude in frequency domain is one of P2 reference sequences that are selected from a time-domain QPSK sequence set based on the length Q of the valid sequence and whose frequency-domain amplitude variances meet a third threshold, where P1 and P2 are positive integers.

The processing unit is specifically configured to determine, if determining that the first parameter meets the following condition, that the first reference signal sequence is the frequency-domain QPSK sequence with the stable amplitude in time domain and/or the time-domain QPSK sequence with the stable amplitude in frequency domain: a size M of a PTRS chunk included in the pattern of the first reference signal is greater than or equal to a first threshold, or a size M of a corresponding chunk that is in a PTRS chunk included in the pattern of the first reference signal and that is for carrying a valid sequence of the first reference signal sequence is greater than or equal to a first threshold, where M and L are positive integers.

In a possible design, the processing unit is further configured to determine a power boosting value of the communication apparatus based on the size of the PTRS chunk in the pattern of the first reference signal, or determine that a power boosting value of the communication apparatus is a fixed value.

In a possible design, the reference signal sequence set further includes a second-type reference signal sequence, and the second-type reference signal sequence is a discrete reference signal sequence.

The transceiver unit is further configured to receive a second reference signal from the first device.

The processing unit is further configured to determine a second reference signal sequence in the second-type reference signal sequence based on the first parameter, and demap the second reference signal based on a second symbol sequence to which the second reference signal sequence is mapped, to obtain a received signal of the second reference signal sequence, where a size of a PTRS chunk included in a pattern of the second reference signal sequence is 1, the second reference signal sequence is used by the second device to estimate impact of phase noise on the received signal. The impact of the phase noise on the received signal includes inter-subcarrier interference and/or a common phase error and/or the phase noise. The first parameter further includes at least one of a pattern of the second reference signal, an MCS threshold used to determine the pattern of the second reference signal, and a bandwidth threshold used to determine the pattern of the second reference signal.

In a possible design, the processing unit is further configured to determine the first reference signal sequence based on an association relationship between the first parameter and the first reference signal sequence, or determine the second reference signal sequence based on an association relationship between the first parameter and the second reference signal sequence.

In a possible design, the transceiver unit is further configured to receive indication information of the first reference signal sequence from the second device, where the indication information of the first reference signal sequence indicates the first reference signal sequence, or receive indication information of the second reference signal sequence from the second device, where the indication information of the second reference signal sequence indicates the second reference signal sequence.

In a possible design, the processing unit is further configured to determine the power boosting value of the communication apparatus based on an MCS of the communication apparatus, or determine that the power boosting value of the communication apparatus is a fixed value.

In a possible design, the processing unit is specifically configured to, if determining that the MCS of the communication apparatus is greater than or equal to a first MCS threshold, determine that the power boosting value is 0 dB, or if determining that the MCS of the communication apparatus is less than a first MCS threshold, determine the power boosting value based on a quantity of demodulation reference signal DMRS ports associated with a phase noise estimation reference signal PTRS port.

In a possible design, the processing unit is specifically configured to, if determining that the MCS of the communication apparatus is greater than a first MCS threshold, determine that the power boosting value is 0 dB, or if determining that the MCS of the communication apparatus is less than or equal to a first MCS threshold, determine the power boosting value based on a quantity of demodulation reference signal DMRS ports associated with a phase noise estimation reference signal PTRS port.

In a possible design, the first parameter includes at least one of a phase noise model of the communication apparatus, a phase noise power spectral density of the communication apparatus, a subcarrier spacing, a carrier frequency, a bandwidth of the communication apparatus, the modulation and coding scheme MCS of the communication apparatus, a modulation order of the communication apparatus, a channel parameter of the communication apparatus, the pattern of the first reference signal, an MCS threshold used to determine the pattern of the first reference signal, and a bandwidth threshold used to determine the pattern of the first reference signal.

In a possible design, the first reference signal sequence is one of a QPSK pseudo-random sequence, a block sequence including a cyclic prefix and a cyclic suffix, a DMRS sequence, a block zero power sequence, a ZC sequence, and a block non-zero power sequence. The second reference signal sequence is one of a QPSK pseudo-random sequence and a DMRS sequence.

According to a fifth aspect, a communication apparatus is provided. The communication apparatus provided in this application has a function of implementing the first device or the second device in the foregoing methods, and includes a corresponding means configured to perform the step or function described in any one of the first aspect or the possible implementations of the first aspect. The step or function may be implemented by using software, hardware (for example, a circuit), or a combination of the hardware and the software. The communication apparatus may be a network device or a terminal device.

In a possible implementation, the apparatus includes one or more processors and a communication unit. The one or more processors are configured to support the communication apparatus in performing a corresponding function of the first device or the second device in the foregoing methods. Optionally, the communication apparatus may further include one or more memories. The memory is coupled to the processor, and stores program instructions and/or data necessary for the apparatus. The one or more memories may be integrated with the processor, or may be separated from the processor. This is not limited in this application.

In another possible implementation, the communication apparatus includes a transceiver, a processor, and a memory. The processor is configured to control the transceiver or an input/output circuit to receive and send a signal, and the memory is configured to store a computer program. The processor is configured to run the computer program in the memory, to enable the communication apparatus to perform the method completed by the first device in any one of the first aspect or the possible implementations of the first aspect.

In a possible implementation, the communication apparatus includes one or more processors and a communication unit. The one or more processors are configured to support the communication apparatus in performing a corresponding function of the first device in the foregoing methods. Optionally, the communication apparatus may further include one or more memories. The memory is coupled to the processor, and stores program instructions and/or data necessary for the terminal device. The one or more memories may be integrated with the processor, or may be separated from the processor. This is not limited in this application. The communication apparatus may be located in a network device or a terminal device, or may be the network device or the terminal device.

In another possible implementation, the apparatus includes a transceiver, a processor, and a memory. The processor is configured to control the transceiver or an input/output circuit to receive and send a signal, and the memory is configured to store a computer program. The processor is configured to run the computer program in the memory, to enable the apparatus to perform the method completed by a transmit end device or a receive end device in any one of the first aspect or the possible implementations of the first aspect.

According to a sixth aspect, a computer-readable storage medium is provided, and is configured to store a computer program. The computer program includes instructions used to perform the method according to any one of the first aspect or the possible implementations of the first aspect.

According to a seventh aspect, a computer program product is provided. The computer program product includes computer program code. When the computer program code is run on a computer, the computer is enabled to perform the method according to any one of the first aspect or the possible implementations of the first aspect.

According to an eighth aspect, a communication apparatus, for example, a chip system, is provided. The apparatus is connected to a memory, and is configured to read and execute a software program stored in the memory, to perform the method according to any one of the first aspect or the possible implementations of the first aspect.

According to a ninth aspect, a communication apparatus is provided. The communication apparatus provided in this application has a function of implementing the first device or the second device in the foregoing method aspects, and includes a corresponding means configured to perform the step or function described in any one of the second aspect or the possible implementations of the second aspect. The step or function may be implemented by using software, hardware (for example, a circuit), or a combination of the hardware and the software. The communication apparatus may be the second device, and the second device may be a network device or a terminal device.

In a possible implementation, the communication apparatus includes one or more processors and a communication unit. The one or more processors are configured to support the communication apparatus in performing a corresponding function of the second device in the foregoing methods.

Optionally, the communication apparatus may further include one or more memories. The memory is coupled to the processor, and stores program instructions and/or data necessary for the apparatus. The one or more memories may be integrated with the processor, or may be separated from the processor. This is not limited in this application.

In another possible implementation, the communication apparatus includes a transceiver, a processor, and a memory. The processor is configured to control the transceiver or an input/output circuit to receive and send a signal, and the memory is configured to store a computer program. The processor is configured to run the computer program in the memory, to enable the apparatus to perform the method completed by the second device in any one of the third aspect or the possible implementations of the third aspect.

In a possible implementation, the apparatus includes one or more processors and a communication unit. The one or more processors are configured to support the communication apparatus in performing a corresponding function of a transmit end device or a receive end device in the foregoing methods. Optionally, the communication apparatus may further include one or more memories. The memory is coupled to the processor, and stores program instructions and/or data necessary for the terminal device. The one or more memories may be integrated with the processor, or may be separated from the processor. This is not limited in this application. The communication apparatus may be located in the second device, and the second device may be a network device or a terminal device.

In another possible implementation, the communication apparatus includes a transceiver, a processor, and a memory. The processor is configured to control the transceiver or an input/output circuit to receive and send a signal, and the memory is configured to store a computer program. The processor is configured to run the computer program in the memory, to enable the apparatus to perform the method completed by the second device in any one of the third aspect or the possible implementations of the third aspect.

According to a tenth aspect, a computer-readable storage medium is provided, and is configured to store a computer program. The computer program includes instructions used to perform the method according to any one of the third aspect or the possible implementations of the third aspect.

According to an eleventh aspect, a computer program product is provided. The computer program product includes computer program code. When the computer program code is run on a computer, the computer is enabled to perform the method according to any one of the third aspect or the possible implementations of the third aspect.

According to a twelfth aspect, a communication apparatus, for example, a chip system, is provided. The apparatus is connected to a memory, and is configured to read and execute a software program stored in the memory, to perform the method according to any one of the third aspect or the possible implementations of the third aspect.

According to a thirteenth aspect, a communication system is provided. The communication system includes a first device configured to perform the method according to the first aspect and a second device configured to perform the method according to the third aspect.

DETAILED DESCRIPTION OF ILLUSTRATIVE EMBODIMENTS

Figure 1A:
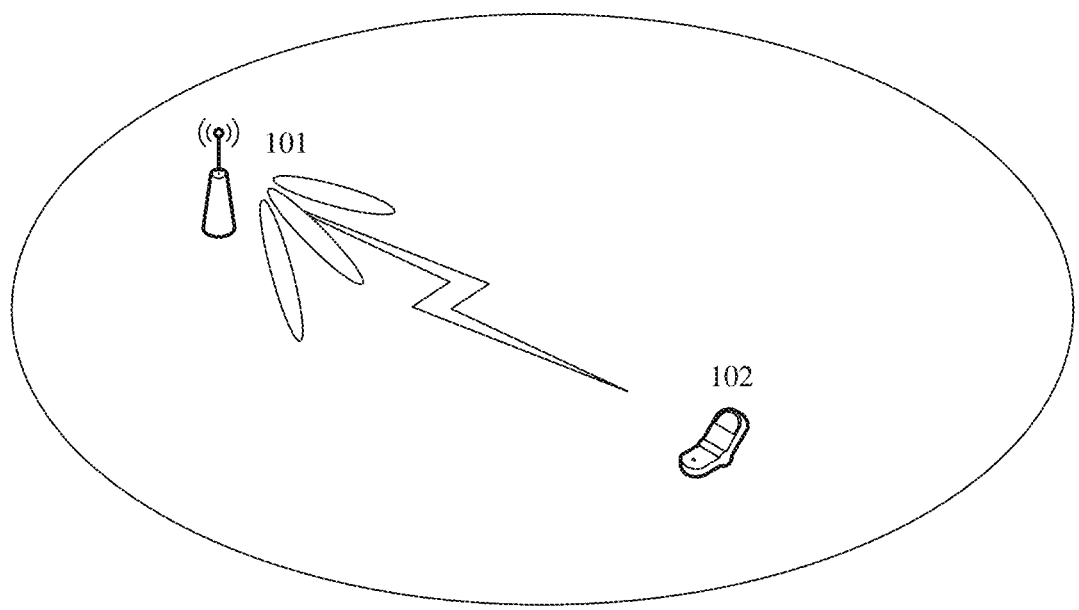
FIG. 1a to FIG. 1c are schematic architectural diagrams of communication systems according to embodiments of this application.

The following describes in detail embodiments of this application with reference to the accompanying drawings.

The following explains and describes some terms in this application, to facilitate understanding by a person skilled in the art.

A terminal device includes a device that provides a user with voice and/or data connectivity, for example, may be a handheld device having a wireless connection function, or a processing device connected to a wireless modem. The terminal device may communicate with a core network via a radio access network (RAN), and exchange voice and/or data with the RAN. The terminal device may include user equipment (UE), a wireless terminal device, a mobile terminal device, a device-to-device (D2D) communication terminal device, a V2X terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device is a device such as a personal communications service (PCS) phone, a cordless phone, a session initiation protocol (SIP) phone, a wireless local loop (WLL) station, or a personal digital assistant (PDA). The terminal device may alternatively include a limited device, for example, a device with low power consumption, a device with a limited storage capability, or a device with a limited computing capability. For example, the terminal device includes an information sensing device, such as a barcode, radio frequency identification (RFID), a sensor, a global positioning system (GPS), or a laser scanner.

By way of example rather than limitation, in embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is a portable device that can be directly worn by a user or integrated into clothes or an accessory of the user. The wearable device is not only a hardware device, but also implements a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, for example, various smart bands or smart jewelry for monitoring physical signs.

A network device may be an evolved NodeB (eNB or eNodeB) in a long term evolution (LTE) system or a radio controller in a cloud radio access network (CRAN), may be a network device in a 5G network, for example, a generation NodeB (gNB), a small cell, or a micro base station in a new radio access technology in 3GPP (NR) system, or a transmission reception point (TRP), or may be any other radio access device such as a relay station, an access point, or a network device in a future evolved public land mobile network (PLMN). Embodiments of this application are not limited thereto.

A time domain resource includes a time unit. The time unit may be a slot, a mini-slot, a symbol, or another time domain granularity (for example, a system frame or a subframe). One slot may include at least one symbol, for example, 14 symbols or 12 symbols.

In 5G NR, one slot may include at least one of a symbol used for downlink transmission, a flexible symbol, a symbol used for uplink transmission, and the like. In this way, compositions of the slot are referred to as different slot formats (SFs), and there may be a maximum of 256 slot formats.

Slots may have different slot types, and different slot types include different quantities of symbols. For example, the mini-slot includes symbols whose quantity is less than 7, for example, two symbols, three symbols, or four symbols, and a common slot includes seven symbols or 14 symbols. Based on different subcarrier spacings, symbol lengths may be different. Therefore, slot lengths may be different.

In frequency domain, because a bandwidth of a 5G NR single carrier may reach 400 MHz, a bandwidth part (BWP) is further defined in one carrier, and may also be referred to as a carrier bandwidth part. The BWP includes several consecutive resource elements such as resource blocks (RBs) in frequency domain. The bandwidth part may be a downlink bandwidth part or an uplink bandwidth part. The terminal device receives or sends data on a data channel in an activated bandwidth part.

A frequency domain resource includes a sub-channel, a band, a carrier, a bandwidth part (BWP), a resource block (RB), a resource element RE, a resource pool, or the like. The RB occupies one subframe or one slot in time domain, and occupies consecutive subcarriers in frequency domain. In LTE, a PRB occupies 14 consecutive OFDM symbols in one subframe in time domain, and occupies 12 consecutive subcarriers in frequency domain.

The sub-channel is a minimum unit of a frequency domain resource occupied by a physical sidelink shared channel, and one sub-channel may include one or more resource blocks (RBs). A bandwidth of a radio communication system in frequency domain may include a plurality of RBs. For example, each possible bandwidth of the LTE system may include 6, 15, 25, or 50 PRBs.

The subcarrier spacing (SCS) is a value of a spacing between center positions or peak positions of two adjacent subcarriers in frequency domain in an OFDM system. In 5G NR, a plurality of subcarrier spacings are used. Different carriers may have different subcarrier spacings. A baseline is 15 kHz, and the subcarrier spacing may be 15 kHz×$2^n$, where n is an integer. The subcarrier spacing ranges from 3.75 kHz, 7.5 kHz, to 480 kHz. For example, for the subcarrier spacing, refer to the following Table 1.

TABLE 1

| μ | $\Delta f = 2^\mu \cdot 15$ [kHz] |
|---|---|
| 0 | 15 |
| 1 | 30 |
| 2 | 60 |
| 3 | 120 |
| 4 | 240 |

μ is used to indicate the subcarrier spacing. For example, when μ=0, the subcarrier spacing is 15 kHz; when μ=1, the subcarrier spacing is 30 kHz. Different subcarrier spacings correspond to different slot lengths. A subcarrier spacing of 15 kHz corresponds to a slot length of 0.5 ms, a subcarrier spacing of 60 kHz corresponds to a slot length of 0.125 ms, and the like. Correspondingly, different subcarrier spacings also correspond to different symbol lengths.

In frequency domain, one RB may include several subcarriers. For example, in the LTE system, one RB includes 12 subcarriers, and each subcarrier spacing may be 15 kHz. Certainly, another subcarrier spacing may alternatively be used, for example, a subcarrier spacing of 3.75 kHz, 30 kHz, 60 kHz, or 120 kHz. This is not limited herein.

A sequence resource is also referred to as a code domain resource, and is a related parameter used to indicate a sequence. For a random sequence, parameters of the sequence include an initial location of the sequence, a length of the sequence, and an initial value of the sequence. For a low peak-to-average ratio sequence (for example, a Zadoff-chu (ZC) sequence), parameters of the sequence include a root sequence, a mask, a scrambling code, a cyclic shift (CS), an orthogonal cover code (OCC), or the like.

The initial value of the sequence is an initial value of a shift register for generating the random sequence (for example, a Gold sequence or an m sequence).

A relationship between the initial location of the sequence and a random sequence used for transmission meets c(n)=c (n+a), n=0, 1, 2, . . . , L−1, where c(n) is the random sequence used for transmission, a is the initial location of the random sequence, L is a length of the random sequence, and a is usually a nonnegative integer, for example, a is 0 or 2.

A reference signal mainly refers to transmission of a reference signal for modulation and demodulation of data. A device sending the reference signal may be a transmit end device that sends control information and first data, or may be a device that performs measurement or provides a synchronization source. The reference signal is used to carry transmitted control information and data, perform channel state information (CSI), radio resource management (RRM), or radio link monitoring (RLM) measurement, perform synchronization, and the like. When the reference signal carries the transmitted data, the data may be carried by using a sequence, or may be carried by using a coded bit of control information in a feedback channel. Specifically, the reference signal may be a demodulation reference signal (DMRS) used by a channel such as a physical downlink shared channel (PDSCH), a physical uplink shared channel (PDSCH), a physical downlink control channel (PDCCH), or a physical uplink control channel (PUCCH). When the CSI, RRM, or RLM measurement is performed on a reference channel, the reference signal may be an RS, a sounding reference signal (SRS), a CSI-RS, or the like. When the reference signal is used for synchronization, the reference signal may be a reference signal used by a physical broadcast channel (physical broadcast channel, PBCH), or the like.

For example, a sequence of the demodulation reference signal may be generated in the following manner:

$$r_l(n)=(1-2c(n))$$

where n=0, 1, 2, . . . , $r_l(\ )$ represents a sequence of the reference signal, and c(n) is a random sequence, where for example, the random sequence is a 31-bit Gold sequence or m-sequence of a shift register.

"A plurality of" means two or more. The term "and/or" describes an association relationship of associated objects, and represents that three relationships may exist. For example, A and/or B may represent the following three cases: Only A exists, both A and B exist, and only B exists. The character "/" usually represents an "or" relationship between the associated objects. In addition, it should be understood that although the terms "first", "second", "third", and the like may be used in embodiments of this application to describe various messages, requests, and terminals, these messages, requests, and terminals are not limited to these terms. These terms are merely used to distinguish the messages, requests, and terminals.

FIG. 1a is a schematic architectural diagram of a communication system to which this application is applicable.

As shown in FIG. 1a, the communication system may include an access point (AP) 101 and at least one station (STA) (where a STA 102 and a STA 103 are used as an example in FIG. 1a). The AP communicates with the STA. The STA may be fixed, or may be mobile. Quantities of APs and STAs included in the communication system are not limited in this application.

The AP is also referred to as an access point, a hotspot, or the like, and is configured to provide a wireless access service, allow access of another wireless device, and provide data access. That is, the AP is an access point for the STA to access a wired network, and may be deployed in a home, inside a building, or inside a campus. A typical coverage radius is tens of meters to hundreds of meters. Certainly, the AP may alternatively be deployed outdoors. The AP is equivalent to a bridge that connects the wired network to a wireless network. A main function of the AP is to connect wireless network clients together, and connect the wireless network to the Ethernet. The AP may be a base station, an evolved NodeB (eNodeB), a transmission reception point (TRP), a next generation NodeB (gNB) in a 5G communication system, a base station in a future communication system, an access node in a Wi-Fi system, or the like, may be a module or a unit that completes some functions of a base station, for example, may be a central unit (CU), a distributed unit (DU), or a router, may be a switch, may be a bridge, or the like. A specific technology and a specific device form that are used by the AP are not limited in this application.

The STA is a communication device connected to the wireless network, for example, a wireless communication chip or a terminal device. The terminal device may also be referred to as a terminal, user equipment (UE), a mobile station, a mobile terminal, or the like. The terminal device may be a mobile phone, a tablet computer, a computer having a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A specific technology and a specific device form that are used by the terminal device are not limited in this application.

Two possible scenarios to which the communication system is applicable are provided below.

Scenario 1: The AP communicates with a single STA.

In Scenario 1, the AP is a transmit end, and the STA is a receive end. That is, the communication system may be used for single-user downlink transmission. Alternatively, the STA is a transmit end, and the AP is a receive end. That is, the communication system may be used for single-user uplink transmission.

Scenario 2: The AP communicates with a plurality of STAs.

In Scenario 2, that the AP simultaneously communicates with the plurality of STAs may be further divided into that the AP simultaneously sends a signal to the plurality of STAs and that the plurality of STAs simultaneously send signals to the AP. When the AP simultaneously sends a signal to the plurality of STAs, that is, the AP is a transmit end, and the STAs are receive ends. That is, the communication system may be used for multi-user downlink transmission. When the plurality of STAs simultaneously send signals to the AP, that is, the STAs are transmit ends, and the AP is a receive end. That is, the communication system may be used for multi-user uplink transmission.

Figure 1B:
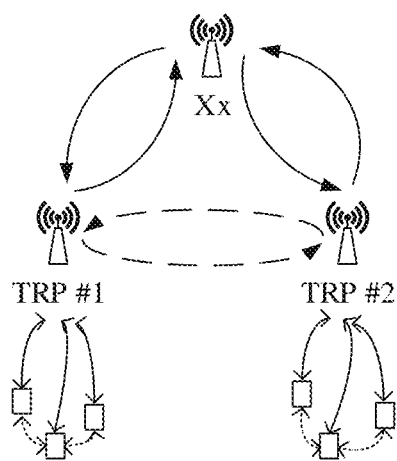

The AP may communicate with the STAs by using a band above 6 GHz, for example, 28 GHz, 39 GHz, 60 GHz, or 73 GHz. For example, the AP is a base station, and the STA is a terminal. The base station may communicate with the terminal by using a millimeter-wave band of a low frequency (mainly below 6 GHz) or a high frequency (above 6 GHz). For example, the millimeter-wave band may be 28 GHz or 38 GHz, or a data-plane enhanced band with a small coverage area, for example, a band above 70 GHz. The terminal in coverage of the base station may communicate with the base station by using the millimeter-wave band of the low frequency or the high frequency. FIG. 1a is a simplified schematic diagram of an example. A network may further include another device, which is not shown in FIG. 1a. As shown in FIG. 1b, in a scenario in which high-frequency phase noise is severe, the present invention may be further applied to backhaul (solid arrows), wireless to the x (WTTx) (solid arrows), enhanced mobile broadband (eMBB) (solid lines with non-solid arrows in the figure), device to device (D2D) (dashed lines with non-solid arrows in the figure), and another high-frequency higher-order high-bit-rate scenario.

Figure 1C:
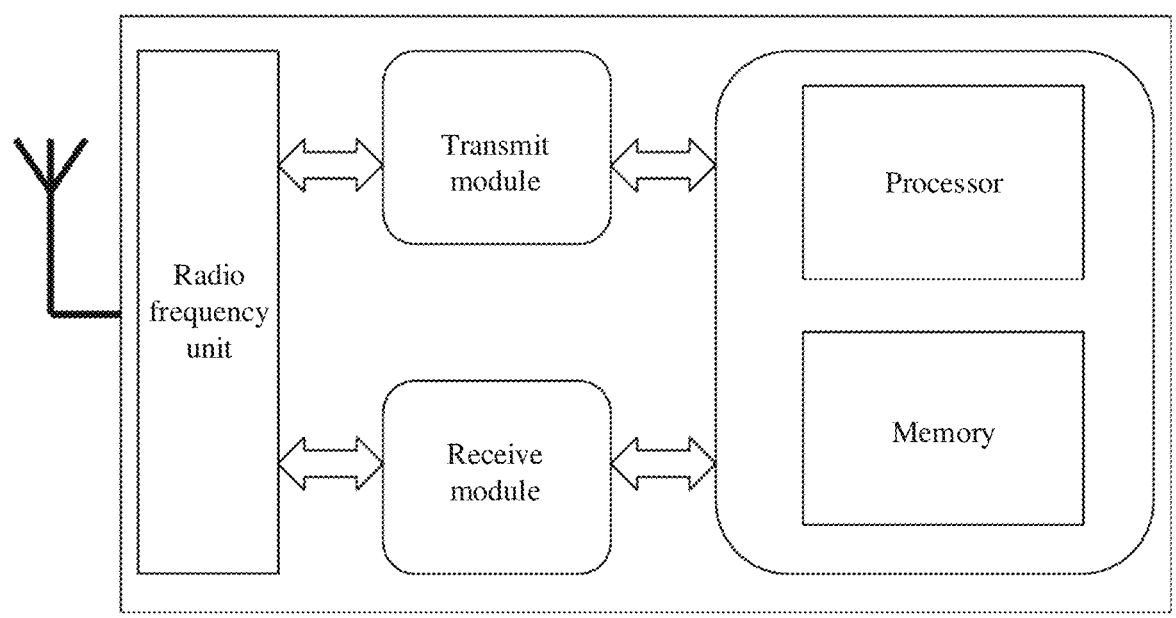

Based on the foregoing content, a reference signal transmission apparatus provided in this application may be located in a communication module of the AP, or may be located in a communication module of the SAT. FIG. 1c is a schematic diagram of a structure of an apparatus for sending or receiving a reference signal according to this application. As shown in FIG. 1c, the apparatus includes a radio frequency unit (RF unit), a transmit module (Tx module), a receive module (Rx module), a processor, and a memory. The Tx module transmits a to-be-sent reference signal to the RF unit for sending. In this case, the Rx module receives the signal from the RF unit, and transmits the signal to the processor for further processing, such as synchronization, channel estimation, or channel equalization.

In a possible implementation, the reference signal transmission apparatus may be an OFDM transmitter. FIG. 1c is a schematic diagram of a structure of the OFDM transmitter according to this application. The OFDM transmitter includes a discrete Fourier transform (DFT) module, a mapping module, a parallel/serial (P/S) converter, a radio frequency (RF) module, and an antenna. The mapping module may be configured to map a signal output by the DFT to a subcarrier, where M represents a quantity of DFT points, and N represents a quantity of IFFT points. It may be understood that the signal transmission apparatus may alternatively be an OFDM receiver. For a structure of the OFDM receiver, refer to the schematic diagram of the structure of the OFDM transmitter. A process of processing a signal by the OFDM receiver is an inverse process of processing a signal by the OFDM transmitter.

Figure 2A:
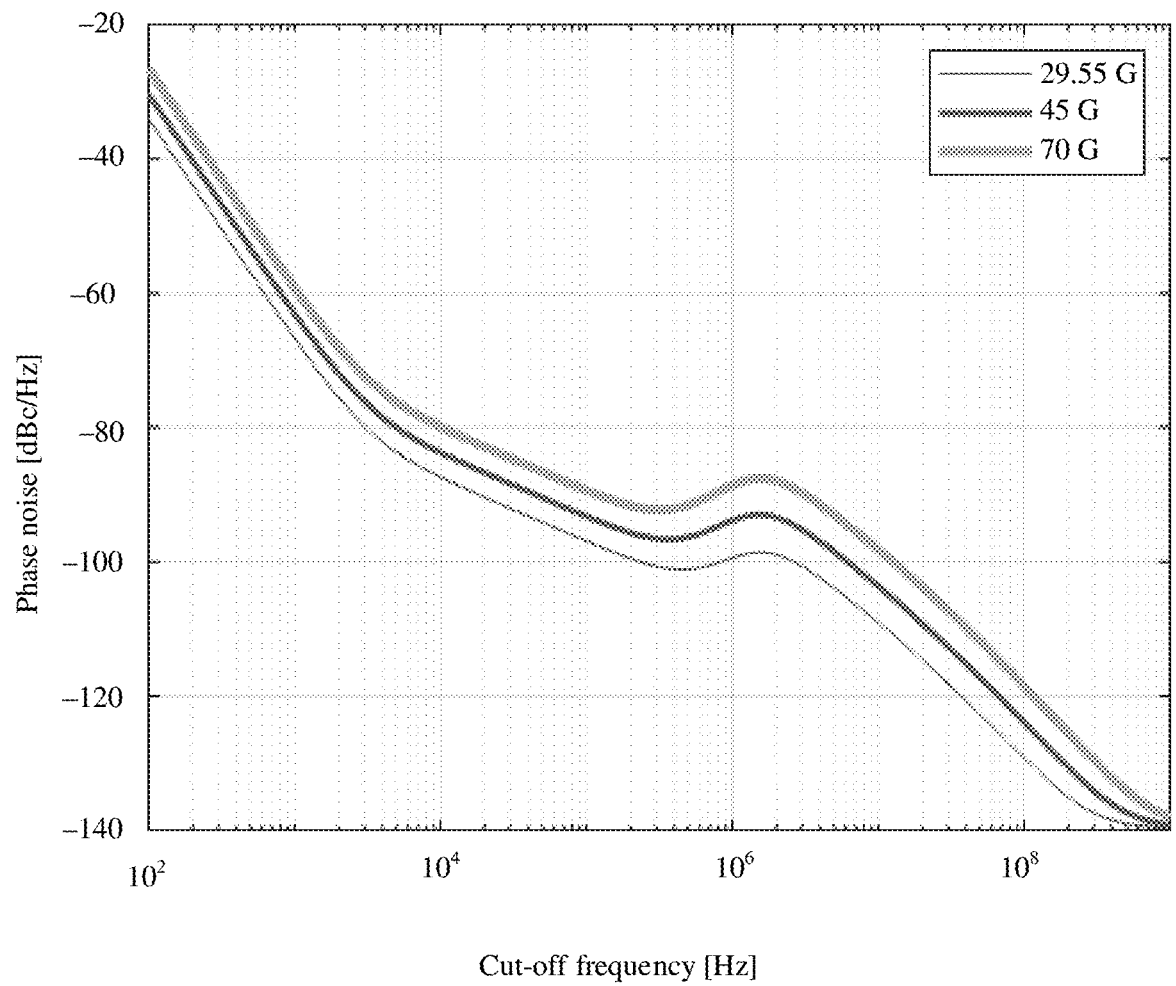
FIG. 2a and FIG. 2b are each a schematic diagram of a phase noise estimation model according to an embodiment of this application.
Figure 2B:
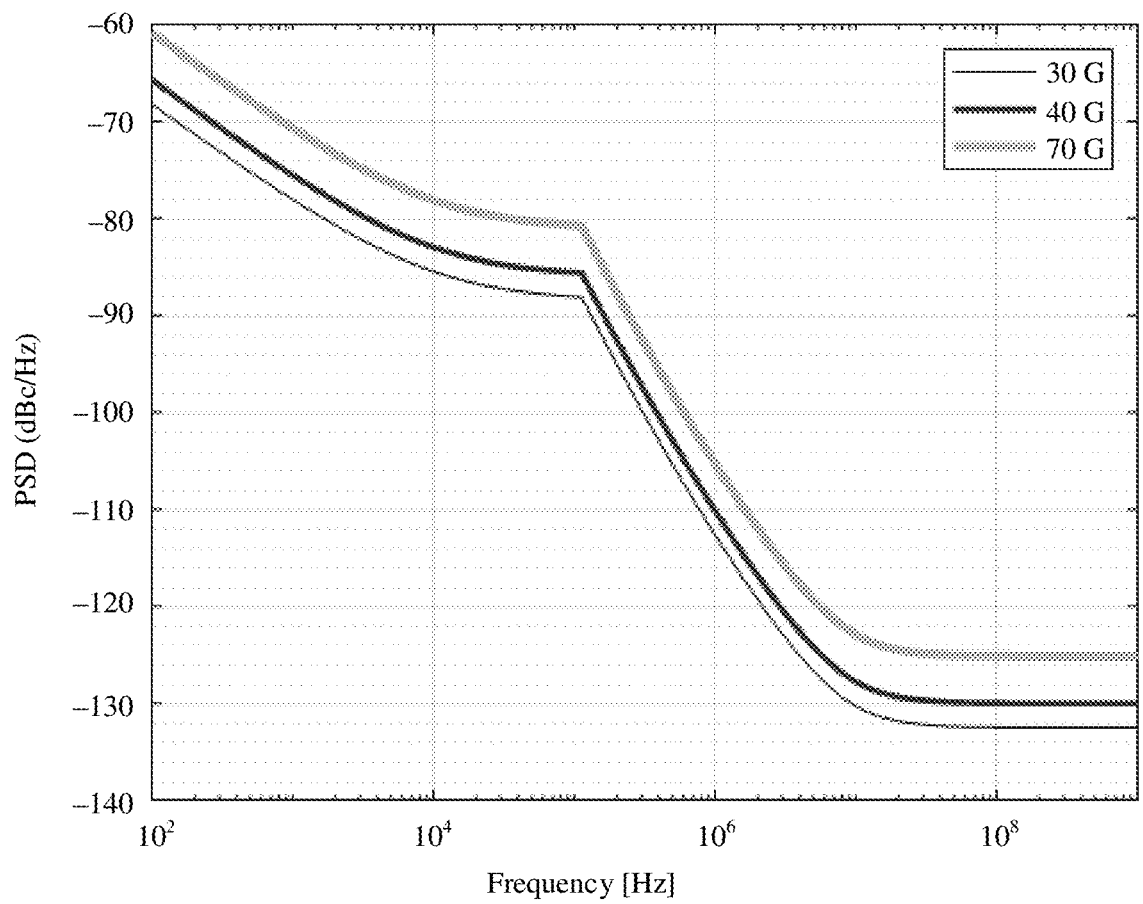

To meet an increasing communication requirement, a requirement on higher-order modulation such as 256QAM (quadrature amplitude modulation) or even 1024QAM becomes increasingly high. Because phase noise is noise caused by non-ideality of a frequency device in the communication system, power spectrum density of the phase noise is higher as a band increases, strength of the phase noise increases as a carrier frequency increases, and impact on a received signal is greater, as shown in FIG. 2a to FIG. 2h respectively. FIG. 2a and FIG. 2b show two phase noise models. It is assumed that phase noise on an orthogonal frequency division multiplexing time domain signal is $\theta_n$, n=0, ..., $N_c$−1 and a frequency domain response of the phase noise is:

$$E_k = \sum_{n=0}^{N_c-1} \frac{e^{j\theta_n}}{N_c} e^{-j*2\pi kn/N_c} \quad k = 0, 1, \ldots, N_c - 1.$$

Impact of the phase noise on a frequency domain signal may be expressed as follows:

$$S = \begin{bmatrix} S_0 \\ S_1 \\ \vdots \\ S_{N_c-2} \\ S_{N_c-1} \end{bmatrix} = Es = \begin{bmatrix} E_0 & E_{N_c-1} & \cdots & E_2 & E_1 \\ E_1 & E_0 & \cdots & E_3 & E_2 \\ \vdots & \vdots & \ddots & \vdots & \vdots \\ E_{N_c-2} & E_{N_c-3} & \cdots & E_0 & E_{N_c-1} \\ E_{N_c-1} & E_{N_c-2} & \cdots & E_1 & E_0 \end{bmatrix} \begin{bmatrix} s_0 \\ s_1 \\ \vdots \\ s_{N_c-2} \\ s_{N_c-1} \end{bmatrix}$$

where $$S_i = E_0 s_i + \sum_{j \neq i} E_j s_{mod(i-j,N_c)} \quad i = 0, 1, \ldots, N_c - 1$$

where $S_i$ is a received signal of a subcarrier i, and $E_0$ is a common phase error (CPE), which is rotation/scaling of an original signal on the subcarrier due to the phase noise. Because a value of $E_0$ is irrelevant to a number of the subcarrier, $$E_0 = \sum_{n=0}^{N_c-1} \frac{e^{j\theta_n}}{N_c}.$$

That is, rotation/scaling of original signals on all subcarriers is the same. Therefore, $E_0$ is referred to as the CPE. In the foregoing formula, a summation formula $\sum_{j \neq i} E_j s_{mod(i-j,N_c)}$ in the second item is inter-carrier interference (ICI) caused by the phase noise to the signal on the subcarrier i.

Figure 2C:
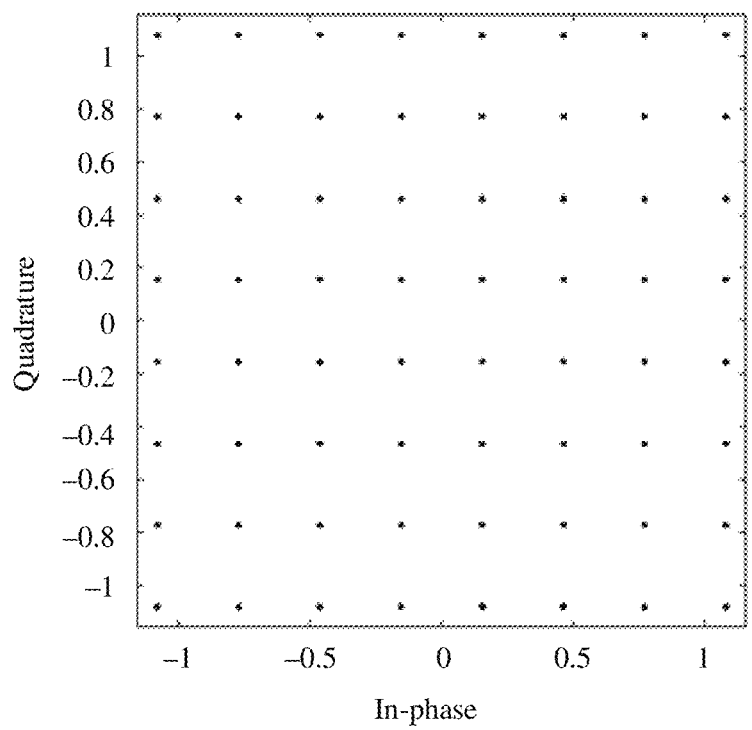
FIG. 2c to FIG. 2e are each a schematic diagram of phase noise estimation according to an embodiment of this application.
Figure 2D:
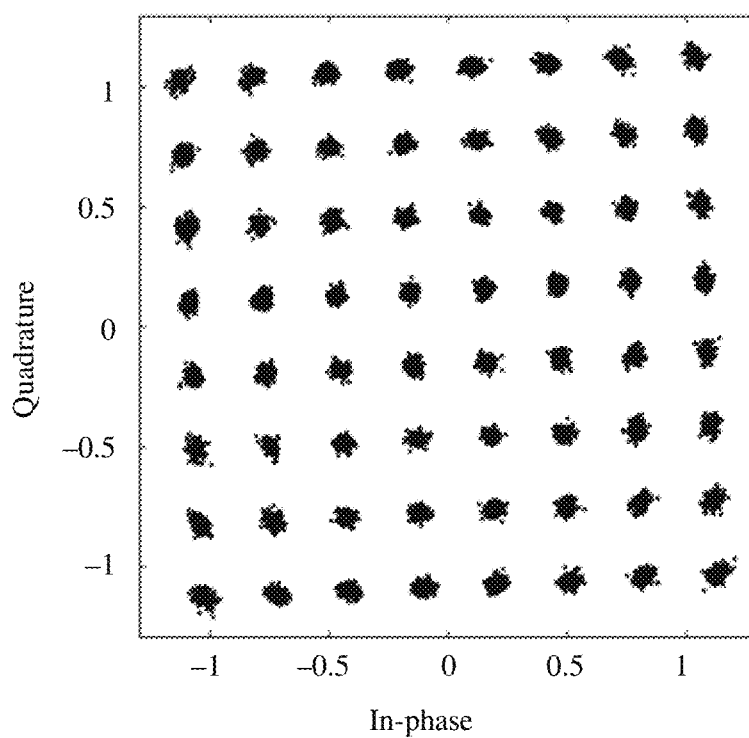
Figure 2E:
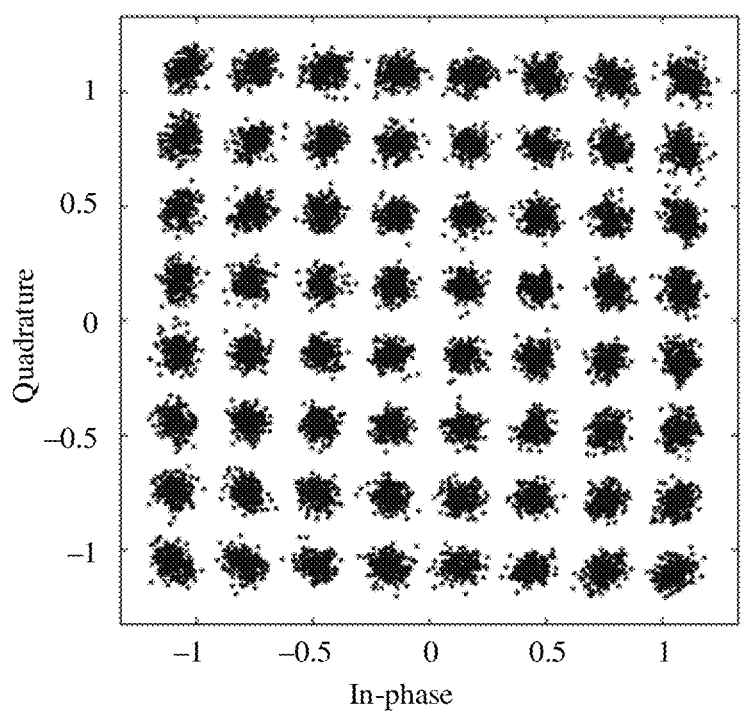
Figure 2F:
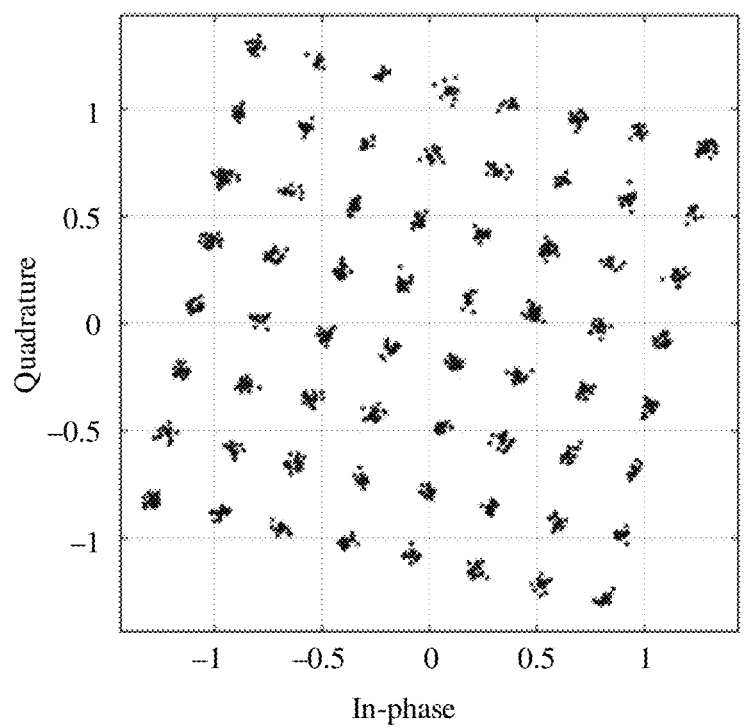
FIG. 2f and FIG. 2h are each a schematic diagram of phase noise estimation according to an embodiment of this application.
Figure 2G:
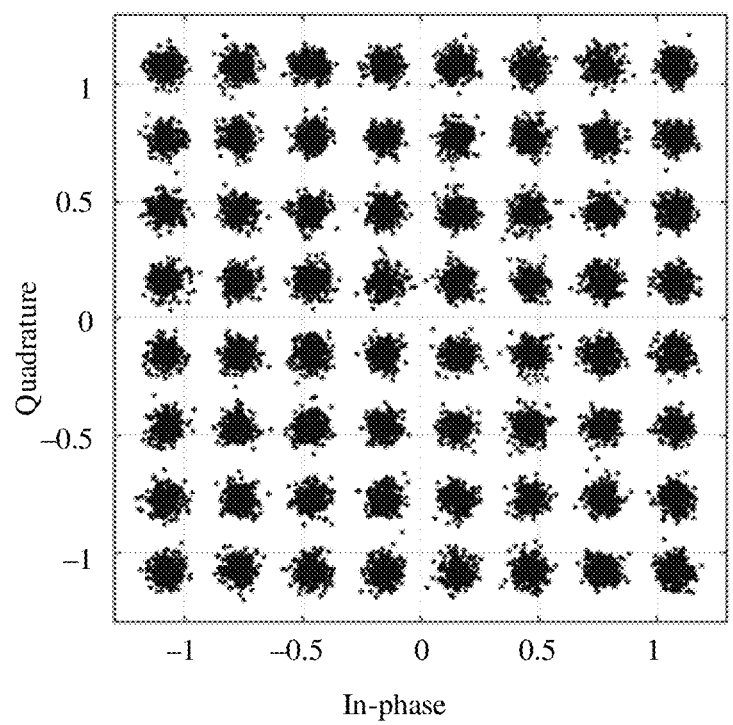
Figure 2H:
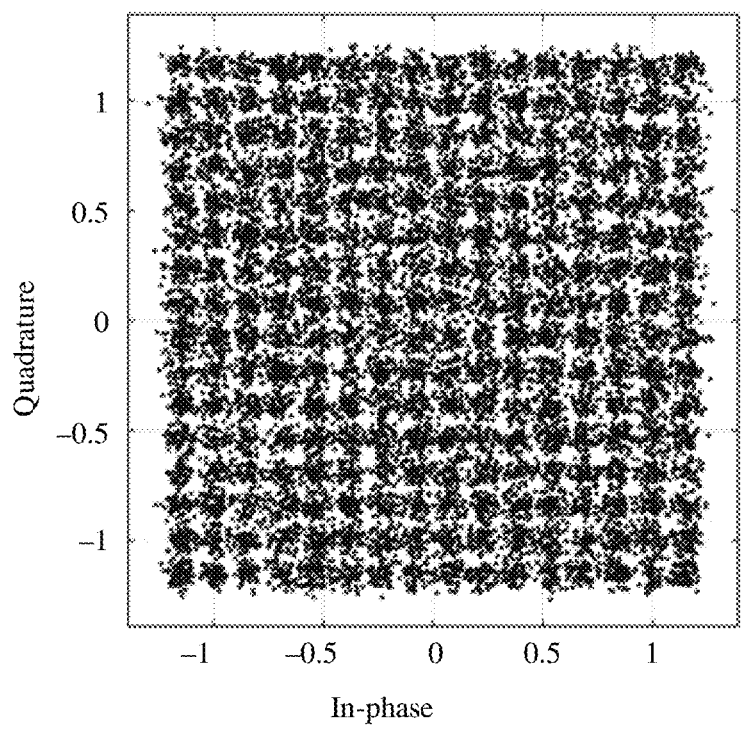

FIG. 2c to FIG. 2e show impact of different phase noise on a received signal in frequency domain (where a horizontal coordinate is in-phase, and a vertical coordinate is quadrature). FIG. 2c shows 32QAM, FIG. 2d shows 64QAM, and FIG. 2e shows 256QAM. FIG. 2f to FIG. 2h show impact of a CPE and ICI of the phase noise on the received signal (in frequency domain) at a same power spectral density. FIG. 2f is a schematic diagram of the CPE. FIG. 2g and FIG. 2h respectively show constellation points of 64QAM and 256QAM after CPE compensation. It can be learned from the rightmost diagram that the constellation points of 256QAM are more blurred than the constellation points of 64QAM due to the inter-subcarrier interference. It can be learned that after a power spectral density of the phase noise reaches a specific level, when a modulation scheme is high, in addition to the CPE, the ICI caused by the phase noise cannot be ignored either. Therefore, estimation on and compensation for the CPE and the ICI caused by the phase noise need to be considered for high-frequency higher-order high-code-rate modulation, so that an OFDM system performs phase tracking, that is, determines phase noise of a signal in the OFDM system.

Figure 3:
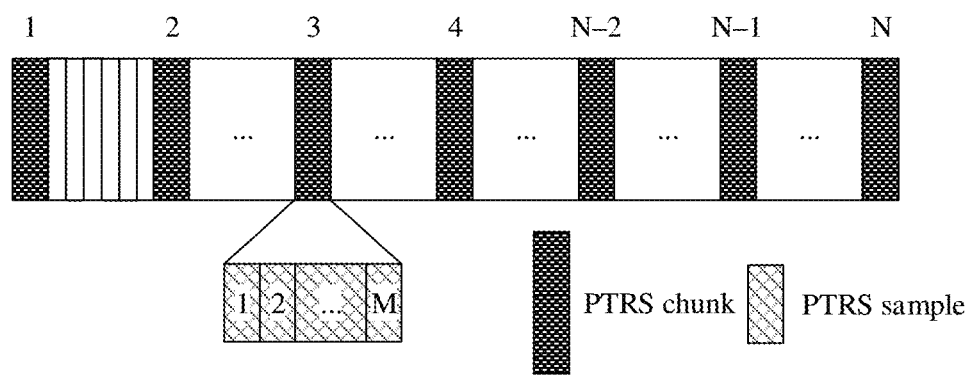
FIG. 3 is a schematic diagram of a pattern of a reference signal sequence according to this application.

For example, FIG. 3 is a schematic diagram of a PTRS pattern according to an embodiment of this application. In FIG. 3, a quantity of PTRS chunks in the PTRS pattern is N, that is, a symbol to which a PTRS is mapped includes N PTRS chunks. Each PTRS chunk may include a plurality of consecutive PTRS samples or consecutive resource elements REs. For ease of description, in this application, a quantity of the plurality of consecutive PTRS samples or consecutive resource elements REs included in the PTRS chunk is referred to as a size of the PTRS chunk. As shown in FIG. 3, a size of each PTRS chunk is M. In this embodiment of this application, the PTRS chunk includes one or more consecutive PTRS signals, the PTRS sample may be one PTRS signal, and a signal carried on one RE may also be one PTRS signal. For example, if M is 1, a reference signal sequence is a discrete reference signal sequence, or if M is greater than 1, a reference signal sequence may be a block reference signal sequence.

Figure 4A:
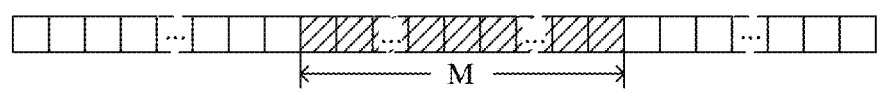
FIG. 4a to FIG. 4c are a schematic diagram of a pattern of a reference signal sequence according to this application.
Figure 4B:
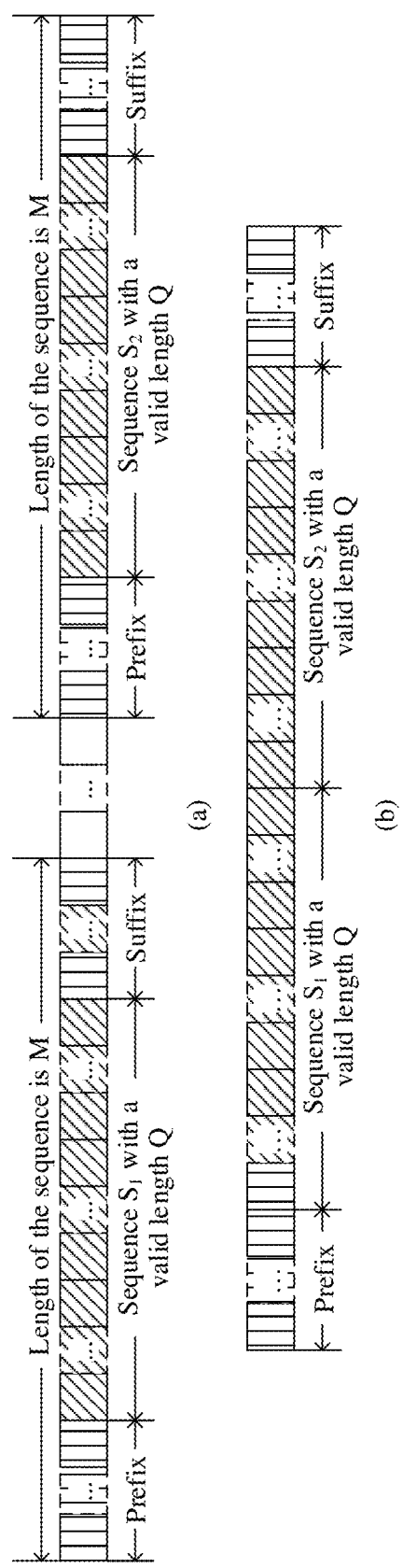

Based on different phase noise ICI estimation manners in the block reference signal sequence, the block reference signal sequence may be classified into a block non-zero power reference signal sequence and a block zero power reference signal sequence. A reference signal sequence pattern estimated based on ICI of the block non-zero power reference signal sequence NZP-PTRS may be shown in FIG. 4a. The reference signal sequence is concentrated on a segment of frequency domain resources, for example, M subcarriers/REs or M/L (where M is an integer multiple of L, and L is a quantity of REs included in one RB, for example, may be 12) RBs. For example, it is assumed that a length of the sequence is M, and the sequence may be obtained by modulating a pseudo-random sequence by using QPSK, or may be obtained by selecting M symbols from a QPSK symbol set, and may be represented as {$s_1$, $s_2$, $s_3$, ..., $s_{M-1}$, $s_M$}, as shown in FIG. 4b.

Figure 4C:
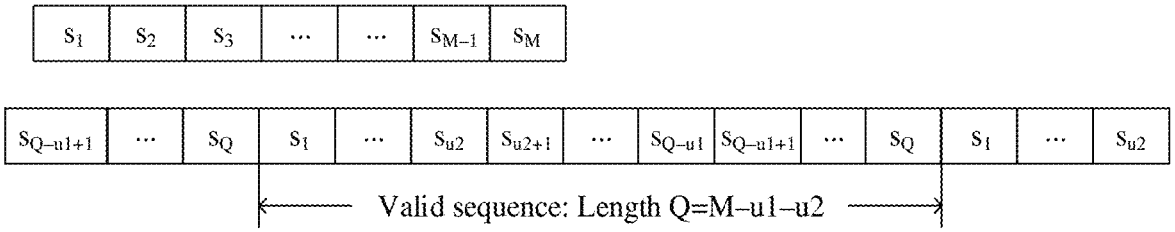

In a scenario in which a guard interval needs to be added, a first reference signal sequence may include a random QPSK symbol and a sequence including a cyclic prefix and a cyclic suffix. It is assumed that a length of the sequence is M, and there are u1 cyclic sequences at the beginning and u2 cyclic sequences at the end. In this case, a length Q of a valid sequence is M-u1-u2. The length of the valid sequence may be obtained by modulating the pseudo-random sequence by using QPSK, or may be obtained by selecting Q symbols from the QPSK symbol set, and may be represented by adding the cyclic sequences at the beginning and the end: $\{s_{M-2u1-u2+1}, \ldots, s_{M-u1-u2}, s_1, s_2, s_3, \ldots, s_{M-u1-u2}, s_1, s_2, \ldots, s_{u2}\}$, as shown in FIG. 4c. $\{s_{M-2u1-u2+1}, \ldots, s_{M-u1-u2}\}$ is a cyclic prefix, and $\{s_1, s_2, \ldots, s_{u2}\}$ is a cyclic suffix.

During ICI estimation based on the block non-zero power reference signal sequence, a matrix may be constructed by using signals transmitted on M resource elements on which the reference signal sequence is located, and an estimated ICI value is obtained through matrix inversion and based on signals received on M or Q REs on which the reference signal sequence is located.

In an existing technology, a reference signal sequence used for ICI estimation is usually a random QPSK sequence, or is randomly selected from a QPSK symbol set and mapped to frequency domain. The reference signal sequence has a constant modulus characteristic in frequency domain, but a characteristic of the reference signal sequence in time domain is not considered. That is, a feature that phase noise is multiplicative noise (that is, the noise affects only a phase of a time domain signal) cannot be fully used to ensure ICI estimation performance of the phase noise.

Figure 5A:
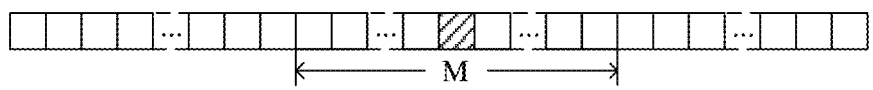
FIG. 5a to FIG. 5c are a schematic diagram of a pattern of a reference signal sequence according to this application.
Figure 5B:
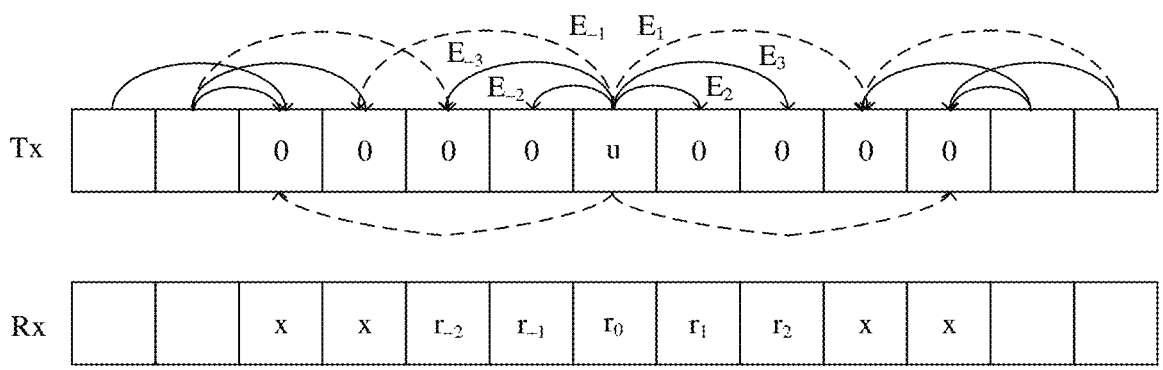

Another reference signal sequence used for phase noise estimation may be a block zero power reference signal sequence ZP-PTRS. A pattern of the block zero power reference signal sequence may be shown in FIG. 5a. The reference signal sequence occupies M resource elements REs. In the block reference signal sequence, a non-zero power reference signal sequence is on a middle RE, and zero power reference signal sequences are on all other REs. In other words, all the other REs are vacant, and no signal is sent. ICI estimation based on the block zero power reference signal sequence is simpler than estimation based on the block non-zero power reference signal sequence, and may be determined by using a transmit signal u transmitted on the middle RE and signals $r_i$ received on the M REs. For example, as shown in FIG. 5b, an estimated ICI value E, may be obtained based on the received signals $r_i$ and the transmit signal u, namely, $E_i=f(r_i, u)$. In a scenario to which the block zero power reference signal sequence is applicable, complexity of phase noise estimation by a first device and a second device can be effectively reduced.

A sequence of the block zero power reference signal sequence is mapped to frequency domain, that is, may be equivalent to an impulse signal in frequency domain. After being transformed to time domain, the reference signal sequence has a constant modulus characteristic. Therefore, the block zero power reference signal may have good performance during time domain phase estimation. It is assumed that a length of the sequence is M. Except that a middle sequence has a valid value, values of other sequences are all 0.

Figure 5C:
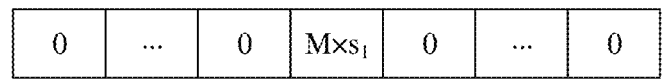

To fully use power on each subcarrier, power on a subcarrier corresponding to a sequence of 0 may be used to increase power of a non-zero sequence, that is, power on a resource element corresponding to non-zero power may be determined based on the size of the PTRS chunk. For example, if the reference signal sequence on the middle resource element is $s_1$, the block zero power reference signal sequence may be represented as $\{0, 0, \ldots, 0, \text{sqrt}(M) \times s_1, 0, \ldots, 0\}$, as shown in FIG. 5c. However, because a signal exists on only one subcarrier in a PTRS chunk of the block zero power reference signal sequence, impact of channel frequency selectivity on the block zero power reference signal sequence is more severe than that on a block non-zero power pilot sequence. In addition, when M is a large value, there may be an excessively large difference between power on a subcarrier corresponding to a reference signal sequence on which power boosting is performed and average power on an adjacent subcarrier used for transmitting data or other information. Consequently, a peak-to-average ratio of a signal is increased, difficulties in demodulating a reference signal by a terminal device are increased, and even parsing cannot be performed.

Based on the foregoing problem, this application provides a reference signal determining method. Refer to a schematic flowchart of the method shown in FIG. 6. The method may be applied to the communication system shown in FIG. 1a, the communication apparatus shown in FIG. 1b, or the OFDM transmitter shown in FIG. 1c, or may be applied to another communication system or another communication scenario. This is not limited in this application. The method includes the following steps.

Step 601: A first device determines a first reference signal sequence in a reference signal sequence set.

The first device in this embodiment of this application may be a network device, and a corresponding second device may be a terminal device. Alternatively, the first device may be a terminal device, and the corresponding second device may be a network device. Alternatively, the first device may be a terminal device, and the corresponding second device may also be a terminal device.

The first reference signal sequence is used by the second device to estimate impact of phase noise on a received signal. The impact of the phase noise on the received signal includes at least one of inter-subcarrier interference, a common phase error, the phase noise, and the like. Specifically, if performance of data demodulation between the first device and the second device is greatly affected by the phase noise, the first reference signal sequence may be used to compensate for impact of CPE/ICI resulting from the phase noise. If the performance of data demodulation between the first device and the second device is slightly affected by the phase noise, a network device in a system may configure other functions of the first reference signal sequence, for example, Doppler estimation and compensation, time synchronization, and channel estimation. This is not limited herein. It should be noted that the network device mentioned in this application may be the first device serving as a network device or the second device serving as a network device, or may be another network device that schedules the first device or the second device. This is not limited herein. Specifically, the network device may configure an association relationship between a function corresponding to the reference signal sequence and the first reference signal sequence, so that the first device may determine the first reference signal sequence in the reference signal sequence set based on the association relationship.

In a possible implementation, the first device and the second device separately determine the first reference signal sequence based on the reference signal sequence set. In another possible implementation, after determining the first reference signal sequence in the reference signal sequence set, the first device sends indication information of the first reference signal sequence to the second device, so that the second device receives the first reference signal sequence on a corresponding transmission resource based on the indication information of the first reference signal sequence, and estimates the impact of the phase noise on the signal received by the second device.

Further, to improve adaptability of a reference signal sequence in a high-frequency high-modulation scenario, the reference signal sequence set includes at least a first-type reference signal sequence. A time-domain amplitude variance and a frequency-domain amplitude variance of the first-type reference signal sequence each meet a preset threshold, so that the first device or the second device can select, by using the reference signal sequence set, a reference signal sequence that has stable amplitude responses in both time domain and frequency domain, to improve accuracy of phase noise estimation. It should be noted that a manner of determining the reference signal sequence set (determining an element in the reference signal sequence set) may be preconfigured by the network device, may be predefined by in a protocol, or preconfigured by using higher layer signaling. Alternatively, the network device indicates the reference signal sequence set for the first device and/or the second device, and pre-stores the reference signal sequence set in the first device and/or the second device. This is not limited herein.

A form of the first-type reference signal sequence applicable to this embodiment of this application is specifically described below.

In a possible implementation, the first-type reference signal sequence may be a block reference signal sequence.

The following specifically describes a block reference signal sequence whose time-domain amplitude variance and/or frequency-domain amplitude variance of the first-type reference signal sequence meet/meets the preset thresholds/threshold.

The first-type reference signal sequence may be a block reference signal sequence generated based on a QPSK symbol.

In a possible implementation, the first-type reference signal sequence may be a sequence whose time-domain QPSK has a stable amplitude in frequency domain. The sequence is defined in frequency domain. To be specific, a value of a symbol in the sequence is {1+1j, 1−1j, −1+1j, −1−1j}/sqrt(2), where sqrt(•) indicates taking a root of "•". Because the sequence is symbols on which QPSK modulation is performed, a frequency domain block reference signal sequence corresponds to a signal having a constant modulus in frequency domain. To be specific, an amplitude corresponding to the block reference signal sequence on each subcarrier or RE is 1, and a frequency-domain modulation symbol is a standard QPSK signal.

In a possible implementation, a frequency-domain QPSK sequence whose time-domain amplitude variance and frequency-domain amplitude variance each meet the preset threshold may be obtained in the following manner. In this case, it is assumed that a length of the sequence is M, and a length of a valid sequence is Q. To be specific, when there is a cyclic prefix and a cyclic suffix, Q=M−u1−u2, or when there is neither cyclic prefix nor cyclic suffix, Q=M. In this case, there are $4^Q$ sequence combinations. After all the $4^Q$ sequences are transformed to time domain through Q-point inverse Fourier transform, a sequence whose time-domain amplitude response meets the preset threshold is selected as the valid sequence of the first-type reference signal sequence.

In a specific implementation process, after all the $4^Q$ sequences are transformed to time domain through Q-point inverse Fourier transform, a sequence whose time-domain amplitude fluctuation meets the preset threshold may be determined as the valid sequence. The fluctuation may be differences between signal amplitudes at samples in time domain. For example, the fluctuation may be an average value avg(abs($x_i$−$x_j$)) of the differences between the signal amplitudes at the samples in time domain, or a maximum value max(abs($x_i$−$x_j$)), max(abs($x_i$))−min(abs($x_i$)), or max ($x_i$)−min($x_i$) in the differences between the signal amplitudes at the samples in time domain, where a signal amplitude at a sample i in time domain is represented as $x_i$, and a signal amplitude at a sample j in time domain is represented as $x_j$. Alternatively, the fluctuation may be variances of the signal amplitudes at the samples in time domain, a mean square error of the amplitudes, or the like. For example, the first P groups of sequences are selected as a valid sequence set of the first-type reference signal sequence in ascending order of the variances of the amplitudes. It can be learned that a larger Q indicates a selected sequence with a more stable amplitude response in time domain. Certainly, the first-type reference signal sequence whose fluctuation meets a first amplitude threshold may alternatively be determined in another manner. This is not limited herein.

In a possible implementation, the first-type reference signal sequence may be a time-domain QPSK sequence with a stable amplitude in frequency domain. The sequence is first defined in time domain. To be specific, a time-domain modulation symbol is a standard QPSK signal or a signal obtained by proportionally scaling the standard QPSK signal. A time-domain block reference signal sequence corresponds to a signal having a constant modulus in time domain. To be specific, an amplitude corresponding to the block reference signal sequence at each sample is 1. A manner of obtaining the sequence is similar to that of obtaining the frequency-domain QPSK sequence with a stable amplitude in time domain. To be specific, $4^Q$ groups of sequences corresponding to a valid length Q are transformed to frequency domain through Q-point Fourier transform, and a sequence whose amplitude response in frequency domain meets the preset threshold is selected as a valid sequence of the first-type reference signal sequence.

For example, when the length of the valid sequence is 8, the sequence whose amplitude response in frequency domain meets the preset threshold may include 128 groups of first-type reference signal sequences. For example, the first-type reference signal sequences may be {0.7071+0.7071i, 0.7071+0.7071i, 0.7071+0.7071i, 0.7071−0.7071i, −0.7071−0.7071i, 0.7071+0.7071i, −0.7071−0.7071i, 0.7071−0.7071i}.

When the first reference signal sequence needs to be mapped to time domain, one of the foregoing P groups of time-domain QPSK sequences with stable amplitudes in frequency domain may be used as the first reference signal, or a signal obtained by performing inverse Fourier transform on one of the foregoing P groups of frequency-domain QPSK sequences with stable amplitudes in time domain may be used as the first reference signal. When the first reference signal sequence needs to be mapped to frequency domain, a signal obtained by performing Fourier transform on one of the foregoing P groups of time-domain QPSK sequences with stable amplitudes in frequency domain may be used as the first reference signal, or one of the foregoing P groups of frequency-domain QPSK sequences with stable amplitudes in time domain may be used as the first reference signal.

It should be noted that the foregoing manner of selecting the QPSK sequence as the first-type reference signal sequence may also be applied to another sequence. Details are not described herein again. For example, the first-type reference signal sequence may alternatively be a BPSK sequence, a pi/2 BPSK sequence, a DMRS sequence, or the like. The BPSK has only two symbols {1, −1}. Therefore, a valid sequence whose length is Q corresponds to 2^Q combinations. The first-type reference signal sequence may be P sequences selected from a time-domain BPSK sequence and whose amplitudes in frequency domain meet the preset threshold, or P sequences selected from a frequency-domain BPSK sequence and whose amplitudes in time domain meet the preset threshold. That is, P sequences whose amplitudes in time domain and frequency domain meet the preset thresholds are selected from the BPSK sequence that has 2^Q sequence combinations and whose valid length is Q as valid sequences of the first-type reference signal sequence.

In addition, the pi/2 BPSK sequence is obtained by adding a phase shift mod(k, 2)×pi/2 related to a mapping location on the BPSK sequence that is determined in the foregoing embodiment and whose amplitude response in time domain or frequency domain meets the preset threshold, where k is determined by the mapping location.

Further, the first-type reference signal sequence may alternatively be a pi/2 BPSK sequence based on Golay complementary sequences in frequency domain. The sequence is defined in frequency domain. To be specific, a frequency-domain modulation symbol is a pi/2 BPSK signal. Because the sequence includes complementary sequences, a length of the sequence may be represented as 2^a×10^b×26^c (a, b, c=0, 1, 2, . . . ). The complementary sequences exist in pairs, and two sequences in a pair of complementary sequences are respectively referred to as a sequence $b_A$ and a sequence $b_B$. The complementary sequences mean that a product of the sequence $b_A$ and the sequence $b_B$ is 0, which may be represented as $b_A \cdot (b_B^H)=0$, where H represents conjugate transposition. The pi/2 BPSK sequence generated based on the complementary sequences may have a plurality of forms. For example, as shown in FIG. 5a, a cyclic prefix and a cyclic suffix are added to each of the two sequences, and the two sequences are independently mapped to different frequency domain resources or samples. For another example, sequences $S_A$ and $S_B$ are spliced to obtain a new sequence [$S_A$ $S_B$], and a cyclic prefix and a suffix are added to the new sequence. For example, the complementary sequences are binary sequences, and the sequence $b_A$ and the sequence $b_B$ may be represented as:

$b_A$=[1,1,1,1,−1,1,−1,−1,−1,1,1,−1,−1,1,1,−1,1,−1,−1, 1];

$b_B$=[1,1,1,1,−1,1,1,1,1,1,−1,−1,−1,1,−1,1,1,−1,1,1,−].

The Golay complementary sequences may be modulated through pi/2-BPSK. Modulated complementary sequences are recorded as $S_A$ and $S_B$ respectively. $S_A$ and $S_B$ have a same length Q. Therefore, the following may be obtained:

$$s_A(k) = b_A(k)\exp\left(-j\frac{\pi}{2}k\right)$$

$$s_B(k) = b_B(k)\exp\left(-j\frac{\pi}{2}k\right)$$

where j is a complex number symbol. It should be noted that, a constellation point modulated through pi/2-BPSK may have different forms. For example, sequence $S_A(k)$ and the sequence $S_B(k)$ each may contain an initial phase. Based on a property of the complementary sequences, each element in a frequency-domain sequence obtained by performing FFT transform on the complementary sequence pair modulated through pi/2-BPSK is a constant. Therefore, the pi/2 BPSK sequence based on the Golay complementary sequences may have constant modulus characteristics in time domain and frequency domain.

In another possible implementation, the first-type reference signal sequence may be a ZC sequence. Because a root sequence of the first-type reference signal sequence has constant modulus characteristics in both time domain and frequency domain, the sequence may be defined in both time domain and frequency domain. That is, a time-domain ZC sequence may be generated as the first-type reference signal sequence, or a frequency-domain ZC sequence may be generated as the first-type reference signal sequence. The first-type reference signal sequence may be determined according to the following formula:

$x(n+N_{Z_c})=x(n), n=0,1,\ldots,M-1$, where $N_{Z_c}$ is a maximum prime number less than M. The ZC sequence may be determined according to the following formula:

$x\_q(n)=\exp(-j \times Pi \times q \times n \times (n+1)/N_{Z_c}), n=0,1,\ldots,N_{ZC}$ where an initial value q may be configured by the network device for the terminal device, or may be determined by the terminal device based on a parameter such as a cell identifier.

In another possible implementation, the reference signal sequence set may further include a second-type reference signal sequence, and the second-type reference signal sequence may be a discrete reference signal sequence.

Figure 7:
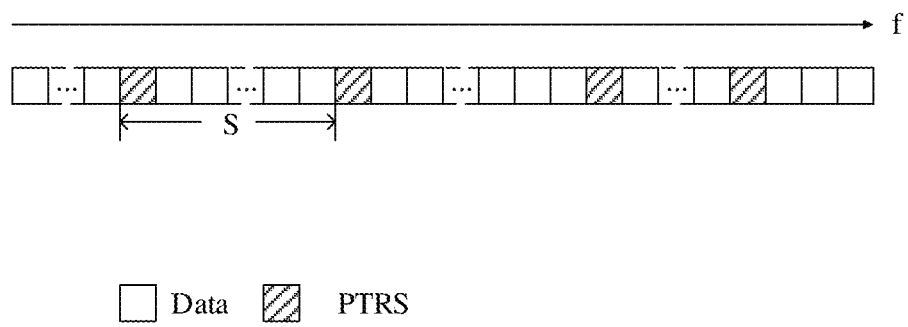
FIG. 7 is a schematic diagram of a pattern of a reference signal sequence according to this application.

As shown in FIG. 7, discrete PTRSs are evenly distributed on one OFDM, and a spacing between PTRS resource elements is S. To be specific, S resource elements (including one PTRS resource element and S−1 data resource elements) are included between two adjacent PTRS resource elements. That is, there is one reference signal on every S subcarriers/resource elements, or there is one reference signal on every S/L resource blocks, where L indicates a quantity of resource elements included in one resource block. In this case, a length of a reference sequence is related to a scheduled bandwidth.

For example, the first reference signal sequence may be a DMRS sequence. For example, the DMRS sequence includes complementary sequences or Golay complementary sequences.

In a possible manner, an original modulation symbol of a DMRS mapped to a subcarrier on which a PTRS is located may be directly used as a modulation symbol of the PTRS. The DMRS and the PTRS are located on different OFDM symbols.

For another example, the first reference signal sequence may be a pseudo-random sequence. To be specific, an original bit sequence is generated by using the pseudo-random sequence, and the first reference signal sequence is obtained through QPSK modulation. The pseudo-random sequence is a 31-bit Gold sequence or m sequence of a shift register:

$c(n)=(x_1(n+N_C)+x_2(n+N_C))\mod 2$ $x_1(n+31)=(x_1(n+3)+x_1(n))\mod 2$ $x_2(n+31)=(x_2(n+3)+x_2(n+2)+x_2(n+1)+x_2(n))\mod 2$ where an initial value of the first m-sequence may be $x_1(0)=1$, $x_1(n)=0$, $n=1, 2, \ldots, 30$, and an initial value of the second m-sequence may be $c_{init}\Sigma_{i=0}^{30}x_2(i) \cdot 2^i$, where $C_{init}$ may be determined based on at least one of a cell identifier, a terminal identifier, a subframe number of the first reference signal, a symbol, and the like.

For an OFDM symbol, the foregoing sequences are mapped to frequency domain. Because the foregoing sequences are all symbols modulated through QPSK, the first reference signal sequence is a signal with a constant modulus in frequency domain, and has a constant amplitude of 1.

A manner for estimating the CPE based on the first-type reference signal sequence is the same as that for estimating the CPE based on the second-type reference signal sequence, and the CPE can be estimated by using only a received signal of an RE on which the reference signal sequence is located and a transmit signal of the reference signal sequence. Therefore, if only the CPE needs to be estimated during phase noise estimation, the first-type reference signal sequence or the second-type reference signal sequence may be selected.

When the ICI is estimated based on the second-type reference signal sequence, the received signal of the RE on which the reference signal sequence is located and a received signal of an RE near the RE on which the reference signal sequence is located are required to construct a matrix, and the ICI estimation value is obtained through matrix inversion and based on the signal transmit of the reference signal sequence.

In comparison with a case in which PTRS patterns corresponding to the first-type reference signal sequence are centralized on one consecutive resource block, PTRS patterns corresponding to the second-type reference signal sequence have better symbol dispersion, are less affected by channel frequency selectivity, and are more resistant to frequency selectivity. Therefore, when a corresponding channel for sending a reference signal is not flat or has severe channel frequency selectivity, a PTRS sequence may be determined as the second-type reference signal sequence.

It should be noted that the second-type reference signal sequence herein may alternatively be a sequence whose time-domain amplitude variance and frequency-domain amplitude variance each meet the preset threshold, to reduce types of reference signal sequences that need to be configured in the reference signal sequence set, and reduce complexity of generating the reference signal sequences by the terminal device. For example, a reference signal sequence set configured for the first device and the second device includes only a sequence whose time-domain amplitude variance and frequency-domain amplitude variance each meet the preset threshold. The sequence is applicable to a scenario of discrete resource elements in a PTRS pattern or a scenario of a chunk size greater than 1 in the PTRS pattern.

It should be noted that the foregoing sequences are merely examples, and the reference signal sequence set may further include another disclosed sequence. The sequence set in the present invention includes but is not limited to the sequences listed above. In addition, the sequence set may not include all the sequences listed above, that is, the sequence set in the present invention may further include at least one of the sequences listed above.

In this embodiment of this application, the reference signal sequence set is determined, and a time-domain amplitude variance and a frequency-domain amplitude variance of the first-type reference signal sequence in the reference signal sequence set may be less than the preset thresholds, so that the PTRS sequence has a stable amplitude response in both frequency domain and time domain, and may be applied to phase noise estimation in both time domain or frequency domain, may be applied to both CPE estimation and ICI estimation, and may be applied to both OFDM and discrete Fourier transform spread orthogonal frequency division multiplexing (Discrete Fourier Transform-spread OFDM, DFT-s-OFDM) or a single carrier, to ensure CPE/ICI estimation accuracy or phase noise estimation accuracy in time domain and frequency domain. This resolves a problem in an existing technology that a time-domain amplitude characteristic of a PTRS sequence used for OFDM fluctuates randomly after the sequence is transformed in frequency domain, and a sequence that has a constant modulus in time domain but does not have a constant modulus in frequency domain or is not flat in frequency domain cannot resist severe channel frequency selectivity, so that ICI estimation precision is improved.

In a specific implementation process, the first device may determine the first reference signal sequence in the reference signal sequence set based on a first parameter.

The first parameter may include at least one of a hardware condition of the first device and/or a hardware condition of the second device, a parameter for transmission between the first device and the second device, a PTRS parameter of the second device, and a parameter of a channel between the first device and the second device, and the like.

In the specific implementation process, the first parameter may include one or more of the foregoing parameters. This is not limited herein.

Specifically, the hardware condition of the first device and/or the hardware condition of the second device may include at least one of a phase noise model of the first device and/or a phase noise model of the second device, and a phase noise power spectral density of the first device and/or a phase noise power spectral density of the second device.

Based on a scenario in which the first device is a network device, and the second device is a terminal device, the parameter for transmission between the first device and the second device may include at least one of a subcarrier spacing, a carrier frequency, a scheduled bandwidth of the second device, a modulation and coding scheme MCS of the second device, and a modulation order of the second device, and the PTRS parameter of the second device may include at least one of an MCS threshold used to determine a pattern of the first reference signal, a bandwidth threshold used to determine the pattern of the first reference signal, the pattern of the first reference signal, and the like.

Based on a scenario in which the first device is a terminal device, and the second device is a network device, the parameter for transmission between the first device and the second device may include at least one of a subcarrier spacing, a carrier frequency, a scheduled bandwidth of the first device, an MCS of the first device, and a modulation order of the first device, and a PTRS parameter of the first device may include at least one of an MCS threshold used to determine a pattern of the first reference signal, a bandwidth threshold used to determine the pattern of the first reference signal, the pattern of the first reference signal, and the like.

Based on a scenario in which the first device is a terminal device, and the second device is a terminal device, the parameter for transmission between the first device and the second device may include at least one of a subcarrier spacing, a carrier frequency, a scheduled bandwidth of the first device, an MCS of the first device, a modulation order of the first device, a scheduled bandwidth of the second device, an MCS of the second device, and a modulation order of the second device, and the PTRS parameter of the second device may include at least one of an MCS threshold used to determine a pattern of the first reference signal, a bandwidth threshold used to determine the pattern of the first reference signal, the pattern of the first reference signal, and the like.

The PTRS parameter may further include a size M01 that is of a maximum chunk occupied by a block zero power reference signal sequence allowed by a hardware condition of uplink transmission and that is fed back by the terminal device, and/or a size M02 of a maximum chunk occupied by a block zero power reference signal sequence allowed by a hardware condition of downlink transmission on the terminal side. Alternatively, the PTRS parameter may be a first threshold M0 (a size of a maximum chunk of a block zero power reference signal sequence used by the first device and/or the second device) that is in uplink/downlink transmission and indicated by the network device in combination with hardware conditions of the network device and the terminal device, or a first threshold M0 (a size of a maximum chunk of a block zero power reference signal sequence used on the base station side) in uplink/downlink transmission of the network device.

The MCS threshold and/or the scheduled bandwidth threshold may be determined based on at least one of the phase noise model, the subcarrier spacing, and the carrier frequency. The subcarrier spacing is a subcarrier spacing of carriers for sending a PTRS, and the carrier frequency is a frequency of the carrier for sending a PTRS. The MCS and the scheduled bandwidth are configured by a network side. A specific configuration method is not limited in this embodiment of this application.

A PTRS pattern in the first parameter may be determined in the following manners.

In a possible implementation, the first device may determine, based on at least one of the MCS and the scheduled bandwidth, a PTRS chunk density associated with the at least one of the MCS and the scheduled bandwidth, and a quantity of PTRS samples or REs included in a PTRS chunk, to determine a PTRS chunk density of the PTRS pattern and the quantity of PTRS samples or REs included in the PTRS chunk.

In another possible implementation, the first device may alternatively directly determine a size of the PTRS chunk of the PTRS pattern and a quantity of PTRS chunks based on at least one of the phase noise level, the subcarrier spacing, the frequency, and a channel condition.

For example, when channel quality fluctuation corresponding to a subcarrier of the second device is less than a second amplitude threshold, it may be determined that a size M of a PTRS chunk of the PTRS pattern of the first reference signal sequence is greater than 1, that is, the PTRS pattern corresponds to a pattern of a block reference signal sequence.

For another example, fluctuation between subcarriers of the second device is greater than the second amplitude threshold. In this case, the first device may determine that channel quality of the second device fluctuates greatly, and may determine that the PTRS pattern is a PTRS that is a discrete resource element or the size M of the PTRS chunk is equal to 1, that is, the PTRS pattern corresponds to a pattern of a discrete reference signal sequence. The fluctuation may include an amplitude difference between subcarriers in frequency domain (an average value of the amplitude differences between the subcarriers, a maximum value in the amplitude differences between the subcarriers, and the like), an amplitude variance, a mean square error of amplitudes, and the like.

In another possible implementation, when the second device is a terminal device, the second device may further feed back a phase noise level to the network device. In this way, the network device may determine the MCS threshold and the scheduled bandwidth threshold based on information fed back by the terminal device, and send the determined MCS threshold and scheduled bandwidth threshold to the terminal device. A specific method for determining the MCS threshold and/or the scheduled bandwidth threshold is not limited in this embodiment of this application. Details are not described herein.

In this embodiment of this application, because the first device and the second device are located in different transmission scenarios, different patterns of the first reference signal sequence or the second reference signal sequence may be determined. Therefore, an association relationship between the first parameter and the first reference signal sequence or the second reference signal sequence may be pre-specified in a protocol or pre-configured by the network device. The first device and/or the second device may determine the first reference signal sequence or the second reference signal sequence based on the first parameter in current scheduling and the association relationship. Similarly, a manner of determining the first reference signal sequence based on the first parameter may be, after determining the PTRS pattern, the first device or the second device uses the PTRS pattern as the first parameter, to determine the first reference signal sequence. Specifically, a manner of determining the first reference signal sequence based on the first parameter may include but is not limited to the following several manners.

Manner 1: The first device determines a first parameter used to generate the first reference signal sequence or a first parameter used to generate the second reference signal sequence, and the first device determines the corresponding first reference signal sequence based on the first parameter. The first parameter used to generate the first reference signal sequence or the first parameter used to generate the second reference signal sequence may be predefined in the protocol or preconfigured by the network device for the first device and/or the second device.

For example, if the first device determines that the first parameter used to generate the first reference signal sequence is a PTRS pattern, the first device may determine a type of the first reference signal sequence based on a size of a PTRS chunk included in the PTRS pattern. In this case, there may be at least one type of reference signal sequences that meet the PTRS pattern in the reference signal sequence set, and the first device may independently select one type of reference signal sequence as required. This is not limited herein.

For another example, if the first device determines that the first parameter used to generate the first reference signal sequence includes a PTRS pattern, a first threshold M0, and a phase noise model, the first device may determine a type of the first reference signal sequence based on specific values of the PTRS pattern, the first threshold M0, and the phase noise model. For example, if it is determined that the phase noise model is a phase noise model in which only CPE needs to be estimated and compensated for, and a size of a PTRS chunk of the PTRS pattern is greater than 1 and less than a first threshold, any reference signal sequence in the first-type reference signal sequence that is in the reference signal sequence set and whose sequence length matches with the PTRS pattern may be selected.

Manner 2: The first device determines an association relationship between the first parameter and the first reference signal sequence. The association relationship may be predefined in the protocol or preconfigured by the network device for the first device and/or the second device. Then, the first device or the second device may determine the first reference signal sequence based on the association relationship between the first parameter and the first reference signal sequence.

For example, the association relationship determined by the first device includes a first association relationship, a second association relationship, a third association relationship, a fourth association relationship, and a fifth association relationship. Specific association relationships may be shown in Table 2.

device generates the first reference signal sequence, and the first reference signal sequence is the sequence that is stable in time domain and frequency domain, namely, a sequence whose time-domain amplitude and frequency-domain amplitude each meet the preset threshold.

The foregoing association relationships are merely examples. In a specific implementation process, an association relationship required in the reference signal sequence set may be determined as required. This is not limited herein.

Manner 1 and Manner 2 may be separately performed, or may be combined. This is not limited herein. Indication

TABLE 2

| Association relationship | PTRS pattern | Reference signal sequence |
| --- | --- | --- |
| First association relationship | M = 1 | DMRS sequence, pseudo-random sequence, and frequency-domain random QPSK sequence |
| Second association relationship | 1 < M ≤ M0 | ZP-PTRS + NZP-PTRS |
| Third association relationship | {M0 < M, and M∈prime number}, or {M0 < M, and Q∈prime number} | ZC sequence |
| Fourth association relationship | {M0 < M, N = 2 × t, M = $2^a \times 10^b \times 26^c$}, or {M0 < M, N = 2 × t, Q = $2^a \times 10^b \times 26^c$}, where t is a positive integer | pi/2 BPSK sequence based on Golay complementary sequences |
| Fifth association relationship | M0 < M, and the PTRS pattern does not conform to a pattern of the third association relationship and a pattern of the fourth association relationship | QPSK sequence that is stable in time domain and frequency domain, BPSK sequence that is stable in time domain and frequency domain, pi/2 BPSK sequence that is stable in time domain and frequency domain |

M is the size of the PTRS chunk, and N is the quantity of PTRS chunks. M0 is the first threshold, and may be determined based on the hardware condition of the first device and/or the hardware condition of the second device. For example, a first threshold M01 may be set for the first device, and a first threshold M02 may be set for the second device as required. Certainly, a first length threshold M1, a second length threshold M2, and the like may alternatively be set as required. For a specific implementation, refer to the following examples. Details are not described herein. a, b, and c are integers, and t is a positive integer.

If determining that the first parameter meets the first association relationship, the first device may determine that the first device generates the second reference signal sequence, for example, one of the DMRS sequence, the pseudo-random sequence, and the frequency-domain random QPSK sequence. If determining that the first parameter meets the second association relationship, the first device may determine that the first device generates the first reference signal sequence, and the first reference signal sequence is the block zero power reference signal sequence. If determining that the first parameter meets the third association relationship, the first device may determine that the first device generates the first reference signal sequence, and the first reference signal sequence is the ZC sequence. If determining that the first parameter meets the fourth association relationship, the first device may determine that the first device generates the first reference signal sequence, and the first reference signal sequence is the pi/2 BPSK sequence based on the Golay complementary sequences. If determining that the first parameter meets the fifth association relationship, the first device may determine that the first manners in Manner 1 and Manner 2 may be notified to the terminal device by using higher layer signaling, RRC, DCI, broadcast, predefinition, or the like. The association relationship may be terminal based (that is, an association relationship of each terminal is independent), or may be cell based (that is, each group shares a same association relationship). Indication content may be an association relationship or a threshold, or may be a quantity adjusted using a specified method. Signaling is used to indicate the first parameter used to determine the first reference signal sequence and/or the association relationship between the first parameter and the first reference signal sequence, so that the first device and/or the second device determine/determines the first reference signal sequence based on the indicated first parameter and/or association relationship between the first parameter and the first reference signal sequence.

In the foregoing manner, the first device or the second device may directly or implicitly determine, based on the first parameter and the association relationship between the first parameter and the reference signal sequence in the reference signal sequence set, the first reference signal sequence or the second reference signal sequence. That is, no additional signaling is required to dedicatedly indicate a specific PTRS sequence, to reduce signaling overheads.

Manner 3: After determining the first reference signal sequence, the network device directly indicates the first reference signal sequence to the terminal device by using signaling. In this manner, the first parameter used to determine the first reference signal sequence or an association relationship between the first parameter and the first reference signal sequence may not need to be indicated.

A specific indication may be explicitly notified to the terminal by using higher layer signaling, radio resource control (RRC) signaling, downlink control information (DCI), a broadcast, or a predefinition, where the explicit notification may be terminal based, or may be cell based. It should be noted that, when the network device explicitly indicates the reference signal sequence, the indicated reference signal sequence may be determined by the network device based on a preconfiguration, or may be determined by the network device in another manner. This is not limited herein.

After determining a type of the first reference signal sequence or of the second reference signal sequence in the reference signal sequence set, the network device indicates the type of the first reference signal sequence or the type of the second reference signal sequence to the terminal by using signaling. This can avoid an estimation error caused by inconsistency between association relationships used by the first device and the second device.

That the first device or the second device may determine the type of the first reference signal sequence or of the second reference signal sequence based on different scenarios and one or more parameters in the first parameter is specifically described below.

Scenario 1

Then, first device may determine the type of the selected first reference signal sequence based on the pattern of the first reference signal. For example, if determining that the size M of the PTRS chunk included in the pattern of the first reference signal is greater than 1 and less than or equal to the first threshold, the first device may select the first reference signal sequence as a block zero power reference signal sequence. The first threshold may be determined based on the hardware condition of the first device and/or the hardware condition of the second device. When the size M of the PTRS chunk of the sequence is less than the first threshold, the block zero power reference signal sequence is used, so that complexity of phase noise estimation can be effectively reduced while precision is ensured and difficulties in parsing a subcarrier by the first device or the second device are not increased. Certainly, if determining that the size M of the PTRS chunk included in the pattern of the first reference signal is greater than 1 and less than or equal to the first threshold, the first device may alternatively select the first reference signal sequence as a block non-zero power reference signal sequence. Specifically, whether the block non-zero power reference signal sequence or the block zero power reference signal sequence is selected may be determined based on the hardware condition of the first device and/or the hardware condition of the second device. This is not limited herein.

For example, assuming that an RB includes L subcarriers, if the first device determines that a length M of the sequence meets M=m×L, where m=1, 2, 3, . . . , and if the sequence is determined as QPSK based on the modulation order, the first reference signal sequence may be determined as a time-domain QPSK sequence with a stable amplitude in frequency domain or a frequency-domain QPSK sequence with a stable amplitude in time domain. A total length M of the sequence occupies an integer quantity of RBs. For example, L=12. In this case, a value of the sequence M is 12, 24, 36, 48, or the like. In this embodiment of this application, the first reference signal sequence may further include a guard interval. To be specific, the reference signal sequence includes a cyclic prefix and/or a cyclic suffix. Assuming that a length of the prefix of the sequence is u1, and a length of the suffix of the sequence is U2, a length Q of a valid sequence to which no cyclic prefix nor cyclic suffix is added is M−u1−u2. In this case, a value of u1 or of u2 may be limited to determine a value of Q. For example, M=m×L, where m=1, 2, or 3, and L=12. When u1=u2=2, the value of Q is 8, 20, 32, or 44. When u1=u2=3, the value of Q is 6, 18, 30, or 42. Further, considering that the guard interval is related to precision of the ICI estimation, it may be considered that the values of u1 and u2 are associated with the value of M. When the length of the first reference signal sequence is greater than the first length threshold, a length of the guard interval needs to be increased. Therefore, the first length threshold M1 may be set. When the length M of the first reference signal sequence is less than or equal to the first length threshold M1, that is, when M≤M1. (for example, M1=24), u1=u2=U0 (for example, U0=2), or when M>M1, u1=u2=U1 (for example, U1=3).

Optionally, a second length threshold M2, a third length threshold M3, and the like may be further set for a long sequence, M3≥M2≥M1, and one interval corresponds to a length value of the cyclic prefix and/or a length value of the cyclic suffix. As shown in the following table, when M≤M1 (for example, M1=24), u1=u2=U0, when M2≥M>M1, u1=u2=U1, when M3≥M>M2, u1=u2=U2, or when M4>M, u1=u2=U3. U0, U1, U2, and U3 are positive integers. The following table is merely an example. Categories (a quantity of intervals or a quantity of cyclic prefix and suffix values) in Table 3 are not limited to four intervals, and may be selected as required.

TABLE 3

| Length M of the sequence | u1/u2 length |
| --- | --- |
| 0 < M ≤ M1 | U0 |
| M1 < M ≤ M2 | U1 |
| M3 < M ≤ M4 | U2 |
| M4 < M | U3 |

Further, if the first device determines that there is at least one group of first reference signal sequences that meet the first parameter in the reference signal sequence set, for example, when the first device determines that a quantity P of groups of selected time-domain QPSK sequences with stable amplitudes in frequency domain or of selected frequency-domain QPSK sequences with stable amplitudes in frequency domain is greater than 1, the first device may further determine one group of specific sequences as the first reference signal sequence based on at least one of information such as a terminal identifier UE-ID, a PTRS port number, a frequency-domain position offset of the PTRS, a scrambling code of the DMRS sequence, a DMRS port number, and cyclic redundancy check (CRC). Correspondingly, the first device may send the selected first reference signal sequence to the second device by using indication information, so that the second device determines, based on the indication information, the first reference signal sequence selected by the first device.

Scenario 2: If the first device determines the length of the valid sequence or the length of the sequence in the PTRS pattern is a prime number, the first reference signal sequence may be a ZC sequence. If the first reference signal sequence does not include a cyclic prefix or a cyclic suffix, the length M of the first reference signal sequence is a prime number. If the first reference signal sequence includes a cyclic prefix and a cyclic suffix, the valid length Q of the first reference signal sequence is a prime number. For example, if the first device determines that the length of the valid sequence of the first-type reference signal sequence is a prime number, $Q=Nz_c$. For example, Q=7, 11, 13, 17, 19, 23, 29, 31, 37, 41, or 43, to ensure a time-frequency constant modulus characteristic of the first-type reference signal sequence.

In a scenario in which the guard interval is considered, if it is determined that the length M of the first reference signal sequence is not a prime number, for example, M=m×L, for example, when L=12, the value of M is 12, 24, 36, 48, or the like, the valid length Q in this condition may be a prime number by limiting the lengths of the cyclic prefix and the cyclic suffix. For example, in a manner of determining lengths of the cyclic sequences u1 and U2 based on a total length of the first reference signal sequence, when M=12, Q may be set to 7, and in this case, u1=3 and u2=2 or U1=2 and u2=3 may exist; when M=24, Q may be set to 19, and in this case, u1=3 and u2=2 or U1=2 and u2=3; when M=24, Q may be set to 17, and in this case, u1=3 and u2=4 or u1=4 and u2=3 may exist; when M=36, Q may be set to 31, and in this case, u1=3 and u2=2 or U1=2 and u2=3 may exist; when M=36, Q may be set to 29, and in this case, u1=3 and u2=4 or u1=4 and u2=3 may exist; when M=48, Q may be set to 43, and in this case, u1=3 and u2=2 or U1=2 and u2=3 may exist; when M=48, Q may be set to 41, and in this case, u1=3 and u2=4 or u1=4 and u2=3 may exist; or when M=48, Q may be set to 37, and in this case, u1=5 and u2=6 or u1=6 and u2=5 may exist.

Scenario 3: In consideration of impact of channel frequency selectivity or a hardware limitation, when a hardware limitation range is exceeded, accuracy of the ICI estimation is severely reduced. When M is large (for example, M≥7), due to power boosting, a difference between power of a subcarrier on which a non-zero power reference signal sequence is located and power of a subcarrier adjacent to the subcarrier is excessively large, and a peak-to-average power ratio (PAPR) of a signal and hardware implementation complexity are increased. Alternatively, the signal exceeds the hardware limitation, caused nonlinear distortion and the like severely deteriorate ICI estimation performance, and significantly increase 256QAM demodulation/decoding difficulty.

The first device determines that the size M of the PTRS chunk in the PTRS pattern is greater than the first t M0 or the size M of the corresponding chunk that is included in the PTRS chunk included in the pattern of the first reference signal and that is for carrying the valid sequence of the first reference signal sequence is greater than or equal to the first threshold M0. The first threshold M0 may be determined based on the hardware condition of the first device and/or the hardware condition of the second device. The first threshold M0 may be agreed on in advance, for example, indicated/notified to the terminal by using radio resource control (RRC), media access control (MAC), or downlink control information (DCI).

In this case, the first device determines, if determining that the first parameter meets the following condition, that the first reference signal sequence is a QPSK sequence that is stable in time domain and frequency domain. In the frequency-domain QPSK sequence with the stable amplitude in time domain and/or the time-domain QPSK sequence with the stable amplitude in frequency domain, the frequency-domain QPSK sequence with the stable amplitude in time domain is one of P1 reference sequences that are selected from a frequency-domain QPSK sequence set based on a length Q of a valid sequence and whose time-domain amplitude variances meet a second threshold, and the time-domain QPSK sequence with the stable amplitude in frequency domain is one of P2 reference sequences that are selected from a time-domain QPSK sequence set based on the length Q of the valid sequence and whose frequency-domain amplitude variances meet a third threshold, where P1 and P2 are positive integers. For a specific selection manner, refer to the embodiment in the scenario 1. Details are not described herein again.

Scenario 4: If determining that the size of the PTRS chunk in the PTRS pattern is $2^a \times 10^b \times 26^c$, or the quantity of PTRS chunks in the pattern of the first reference signal is an integer multiple of 2, the first device may determine that the first reference signal sequence is a pi/2 BPSK sequence based on Golay complementary sequences in frequency domain. In this case, the length M of the first reference signal sequence is greater than M0, the quantity of PTRS chunks of the first reference signal sequence is an even number, and the valid length Q of the first reference signal sequence may be $2^a \times 10^b \times 26^c$. To be specific, if the first reference signal sequence does not include the cyclic prefix or the cyclic suffix, the length M of the first reference signal sequence is a $2^a \times 10^b \times 26^c$. If the first reference signal sequence includes the cyclic prefix and the cyclic suffix, the valid length M of the first reference signal sequence is $2^a \times 10^b \times 26^c$. Alternatively, the quantity of PTRS chunks of the first reference signal sequence is an odd number, and a half of the valid length Q of the first reference signal sequence is $2^a \times 10^b \times 26^c$ (a≥0). That is, the length Q of the valid sequence is $2 \times 2^a \times 10^b \times 26^c$. To be specific, if the first reference signal sequence does not include the cyclic prefix or the cyclic suffix, the length of the first reference signal sequence is $2 \times 2^a \times 10^b \times 26^c$, or if the first reference signal sequence includes the cyclic prefix and the cyclic suffix, the valid length of the first reference signal sequence is $2 \times 2^a \times 10^b \times 26^c$.

Scenario 5: If determining that the size M of the PTRS chunk in the PTRS pattern is less than M0, and selecting a subcarrier, an RE, or a symbol location that is used for mapping the PTRS and at which channel quality fluctuates slightly, the first device may select a block zero power reference signal sequence or a block non-zero power reference signal sequence as the first reference signal sequence.

For example, the first device may determine, based on the first parameter, that the size M of the chunk in the PTRS pattern is less than the first threshold M0. Further, the first device may select a subcarrier, the RE, or the symbol location that is used for mapping the PTRS and at which a channel quality fluctuation is less than the second amplitude threshold, to improve precision of phase noise estimation.

Scenario 6: If determining that the size of the PTRS chunk included in the pattern of the second reference signal sequence is 1, the first device may determine the second reference signal sequence in the second-type reference signal sequence. In this case, the second reference signal sequence may be a discrete reference sequence. Specifically, the second reference signal sequence may be a reference signal sequence that is the same as a DMRS sequence, a pseudo-random sequence, or a frequency-domain random QPSK sequence. A specific form of the second reference signal sequence may be any one type in the second-type reference signal sequence, or may be determined as required. This is not limited herein.

Scenario 7: When only the CPE needs to be estimated, or when a modulation and coding scheme is low or phase noise is ideal, impact of an amplitude in time domain on the ICI estimation does not need to be considered. The block reference signal sequence may be a random frequency-domain QPSK sequence. Similar to the discrete reference sequence, refer to an implementation of the discrete reference sequence. Details are not described herein again.

It should be noted that the foregoing is merely an example. The first device may further determine a type of the first reference signal sequence based on one or more parameters in the first parameter, to determine a specific value of the first reference signal sequence. This is not limited herein.

The first device may further determine a power value of the first reference signal sequence or of the second reference signal sequence, to further improve accuracy of phase noise estimation.

Because overheads of the PTRS are small, and maximum overheads are 1/24 in a current protocol, impact on power of an entire OFDM symbol is limited. Therefore, in a possible implementation, power boosting may be performed on a fixed value of the PTRS. For example, power boosting of fixed 3 dB may be set. In another possible implementation, different power boosting values may be further set for different reference signal sequences. For example, the power boosting value may be determined based on the PTRS pattern, the PTRS sequence, or the first parameter.

Manner 1

The first device determines a power boosting value of the second device based on the size of the PTRS chunk in the pattern of the first reference signal.

For example, when a PTRS pattern type, a discrete zero power reference signal sequence, or a sequence that is determined based on a scenario parameter is a ZP-PTRS+NZP-PTRS, a power boosting value of an NZP-PTRS in each chunk is $10 \times lg(M)$ dB, where M is a size of the chunk.

In another possible implementation, within an allowable range of the hardware capability of the first device and/or the second device, power on a resource element corresponding to zero power may be determined based on the size of the PTRS chunk. For example, if a reference signal sequence on a middle resource element is $s_1$, a block zero power reference signal sequence may be represented as $\{0, 0, \ldots, 0, sqrt(M) \times s_1, 0, \ldots, 0\}$.

Manner 2

In a possible implementation, when a PTRS sequence determined by using a scenario parameter is a QPSK/BPSK/pi/2 BPSK sequence with stable amplitudes in time domain and frequency domain, a ZC sequence, or a pi/2 BPSK sequence based on Golay complementary sequences in frequency domain, power of the first reference signal sequence may be fixedly boosted by 3 dB.

In another possible implementation, the power boosting value is determined based on a modulation order. For example, when the modulation order is less than or equal to 64QAM, the power boosting value of the first reference signal sequence may be 0 dB, when the modulation order is 256QAM, the power boosting value of the first reference signal sequence may be 4.23 dB, or when the modulation order is 1024QAM, the power boosting value of the first reference signal sequence may be 4.5 dB.

In another possible implementation, the power boosting value may alternatively be determined based on a code rate or the MCS. A higher code rate or MCS indicates a lower power boosting value. For example, when the MCS of the second device is greater than a first MCS threshold, the power boosting value is set to 0, or if the first device determines that the MCS of the second device is less than or equal to the first MCS threshold, the power boosting value of the second device is determined based on a quantity of DMRS ports associated with a PTRS port of the second device.

Manner 3

In a possible implementation, the power boosting value of the second reference signal sequence is determined by a quantity of orders of the ICI that needs to be estimated by the second device.

For example, if the first device determines that the second reference signal sequence is a discrete reference signal sequence, and the quantity of orders of the ICI that needs to be estimated is 1, power may be boosted by 3 dB, or the power boosting value is determined based on a quantity of transport layers in an existing protocol. If the quantity of orders of the ICI is 1, it indicates that only the CPE is estimated.

For example, if the first device determines that the second reference signal sequence is a discrete reference signal sequence, and the quantity of orders of the ICI that needs to be estimated is greater than 1, the first device determines that the power boosting value of the second reference signal sequence is 0 dB. If the quantity of orders of the ICI is greater than 1, it indicates that the ICI needs to be estimated.

In another possible implementation, the power boosting value of the second reference signal sequence is determined by the MCS of the second device.

Specifically, if the first device determines that the MCS of the second device is greater than or equal to the first MCS threshold, the power boosting value of the second device is 0 dB, or if the first device determines that the MCS of the second device is less than the first MCS threshold, the power boosting value of the second device is determined based on a quantity of DMRS ports associated with a PTRS port of the second device.

Alternatively, if the first device determines that the MCS of the second device is greater than a first MCS threshold, the power boosting value of the second device is 0 dB, or if the first device determines that the MCS of the second device is less than or equal to the first MCS threshold, the power boosting value of the second device is determined based on a quantity of DMRS ports associated with a PTRS port of the second device.

For another example, the power boosting value of the second reference signal sequence may be a fixed value, and a specific value of a fixed value may be determined as required. This is not limited herein.

Step 602: The first device maps the first reference signal sequence to a first symbol sequence, and sends a first reference signal corresponding to the first reference signal sequence to the second device.

In a process of determining the first reference signal sequence, the first device may further determine a specific value of the first reference signal sequence based on parameters of the first reference signal sequence. The parameters of the first reference signal sequence may include an initial location of the sequence, a cyclic shift of the sequence, and an initial value of the sequence. For a low peak-to-average ratio sequence (for example, a ZC sequence), parameters of the sequence may further include a root sequence, a mask, a scrambling code, a cyclic shift (CS), an orthogonal cover code (OCC), or the like.

For example, a specific initial value of the sequence, the initial location of the sequence, the cyclic shift of the sequence, and the like may be determined based on at least one of a UE-ID, a cell ID, a subframe number, a symbol, a PTRS port number, an associated DMRS port number, and the like, to determine a specific value of the first reference signal sequence.

Step 603: The second device determines the first reference signal sequence in the reference signal sequence set.

For a specific implementation process, refer to a manner in which the first device determines the first reference signal sequence in the reference signal sequence set. Details are not described herein again. For example, the second device may first determine the PTRS pattern, and determine the first reference signal sequence based on the PTRS pattern and another first parameter. Alternatively, the second device may determine the first reference signal sequence based on the PTRS pattern indicated by the first device and another first parameter.

Step 604: The second device receives the first reference signal from the first device, and demaps the first reference signal based on the first symbol sequence to which the first reference signal sequence is mapped, to obtain a received signal of the first reference signal sequence.

The reference signal determining method provided in this application may be applied to a scenario of a high frequency and a high code rate. According to the foregoing solution, not only estimation accuracy of the CPE and/or the ICI in a given scenario can be ensured, but also an optimal sequence may be obtained through adaptive adaptation based on a scenario, to optimize estimation performance of the CPE and/or the ICI. When PTRS overheads are given, demodulation performance is improved, and complexity is reduced, to improve spectral efficiency.

Figure 8:
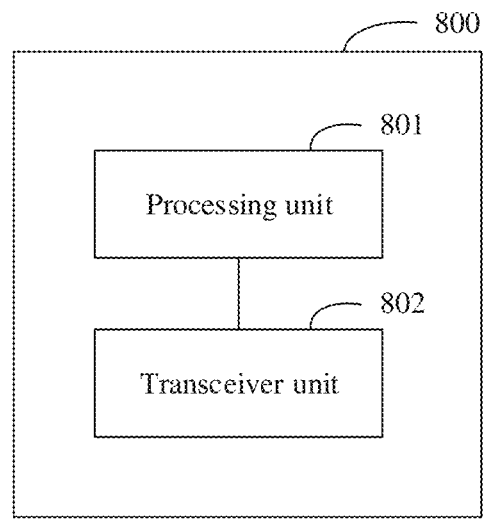
FIG. 8 is a schematic diagram of a pattern of a reference signal sequence according to this application.

The reference signal determining method provided in this embodiment of this application is described above with reference to FIG. 6. Based on a same inventive concept as the reference signal determining method, an embodiment of this application further provides a communication apparatus. As shown in FIG. 8, a communication apparatus 800 includes a processing unit 801 and a transceiver unit 802. The communication apparatus 800 (referred to as an apparatus 800 for short below) may be configured to implement the method performed by the first device in the foregoing embodiment. The apparatus 800 may be a network device or a terminal device, may be located in the network device or the terminal device, or may be the first device or a transmit end device.

It should be noted that the apparatus 800 may be a network device or a terminal device, or may be a chip used in the network device or the terminal device, or another combined device, component, or the like that has a function of the foregoing network device or terminal device. When the apparatus 800 is a network device or a terminal device, the transceiver unit may be a transceiver, which may include an antenna, a radio frequency circuit, and the like. The processing module may be a processor, for example, a central processing unit (ceCPU). When the apparatus 800 is a component having a function of the network device or the terminal device, the transceiver unit may be a radio frequency unit, and the processing module may be a processor. When the apparatus 800 is a chip system, the transceiver unit may be an input/output interface of the chip system, and the processing module may be a processor of the chip system.

In an embodiment, the apparatus 800 may be configured to perform the steps performed by the first device in the foregoing method embodiment, or perform steps performed by the transmit end device.

Specifically, the processing unit 801 is configured to determine a first reference signal sequence in a reference signal sequence set, where the first reference signal sequence is used by a second device to estimate impact of phase noise on a received signal, and the impact of the phase noise on the received signal includes at least one of inter-subcarrier interference, a common phase error, and the phase noise, the reference signal sequence set includes at least a first-type reference signal sequence, and a time-domain amplitude variance and/or a frequency-domain amplitude variance of the first-type reference signal sequence meet/meets preset thresholds/a preset threshold. The transceiver unit 802 is configured to map the first reference signal sequence to a first symbol sequence, and send a first reference signal corresponding to the first reference signal sequence to the second device based on the first symbol sequence.

In a possible design, the processing unit 801 is specifically configured to determine the first reference signal sequence in the reference signal sequence set based on a first parameter, where the first parameter includes at least one of a parameter for transmission between the first device and the second device, and a pattern of the first reference signal.

In a possible design, the reference signal sequence set includes a pi/2 BPSK reference signal sequence based on Golay complementary sequences. The processing unit 801 is specifically configured to determine, if determining that the first parameter meets the following condition, that the first reference signal sequence is the pi/2 BPSK reference signal sequence based on the Golay complementary sequences: a size of a PTRS chunk is $2^a \times 10^b \times 26^c$, or a size of a corresponding chunk that is in a PTRS chunk and that is for carrying a valid sequence of the first reference signal sequence is $2^a \times 10^b \times 26^c$, where a, b, and c are integers.

In a possible design, the reference signal sequence set includes a ZC sequence. The processing unit 801 is specifically configured to determine, if determining that the first parameter meets the following condition, that the first reference signal sequence is the ZC sequence: a size of a PTRS chunk is a prime number, or a size of a chunk that is in a PTRS chunk and that is for carrying a valid sequence of the first reference signal sequence is a prime number.

In a possible design, the reference signal sequence set includes a frequency-domain QPSK sequence with a stable amplitude in time domain and/or a time-domain QPSK sequence with a stable amplitude in frequency domain, where the frequency-domain QPSK sequence with the stable amplitude in time domain is one of P1 reference sequences that are selected from a frequency-domain QPSK sequence set based on a length Q of a valid sequence and whose time-domain amplitude variances meet a second threshold, and the time-domain QPSK sequence with the stable amplitude in frequency domain is one of P2 reference sequences that are selected from a time-domain QPSK sequence set based on the length Q of the valid sequence and whose frequency-domain amplitude variances meet a third threshold, where P1 and P2 are positive integers.

The processing unit 801 is specifically configured to determine, if determining that the first parameter meets the following condition, that the first reference signal sequence is the frequency-domain QPSK sequence with the stable amplitude in time domain and/or the time-domain QPSK sequence with the stable amplitude in frequency domain, a size M of a PTRS chunk included in the pattern of the first reference signal is greater than or equal to a first threshold, or a size M of a corresponding chunk that is in a PTRS chunk included in the pattern of the first reference signal and that is for carrying a valid sequence of the first reference signal sequence is greater than or equal to a first threshold, where M and L are positive integers.

In a possible design, the processing unit 801 is further configured to, if determining that the first reference signal sequence is a block non-zero power sequence, determine a power boosting value of the second device based on the size of the PTRS chunk in the pattern of the first reference signal, or the processing unit 801 is further configured to determine that a power boosting value of the first reference signal sequence is a fixed value.

In a possible design, the reference signal sequence set further includes a second-type reference signal sequence, and the second-type reference signal sequence is a discrete reference signal sequence. The processing unit 801 is further configured to determine a second reference signal sequence in the second-type reference signal sequence based on the first parameter, where a size of a PTRS chunk included in a pattern of the second reference signal sequence is 1, the second reference signal sequence is used by the second device to estimate impact of phase noise on a received signal, and the impact of the phase noise on the received signal includes at least one of inter-subcarrier interference, a common phase error, and the phase noise.

The transceiver unit 802 is further configured to map the second reference signal sequence to a second symbol sequence, and send a second reference signal corresponding to the second reference signal sequence to the second device, where the first parameter further includes at least one of a pattern of the second reference signal, an MCS threshold used to determine the pattern of the second reference signal, and a bandwidth threshold used to determine the pattern of the second reference signal.

In a possible design, the processing unit 801 is further configured to determine the power boosting value of the second device based on an MCS of the second device.

In a possible design, the processing unit 801 is specifically configured to, if determining that the MCS of the second device is greater than or equal to a first MCS threshold, determine that the power boosting value of the second device is 0 dB, or if determining that the MCS of the second device is less than a first MCS threshold, determine the power boosting value of the second device based on a quantity of DMRS ports associated with a PTRS port of the second device.

In a possible design, the processing unit 801 is specifically configured to, if determining that the MCS of the second device is greater than a first MCS threshold, determine that the power boosting value of the second device is 0 dB, or if determining that the MCS of the second device is less than or equal to a first MCS threshold, determine the power boosting value of the second device based on a quantity of DMRS ports associated with a PTRS port of the second device.

In a possible design, the processing unit 801 is further configured to determine the first reference signal sequence based on an association relationship between the first parameter and the first reference signal sequence, or determine the second reference signal sequence based on an association relationship between the first parameter and the second reference signal sequence.

In a possible design, the transceiver unit 802 is further configured to send indication information of the first reference signal sequence to the second device, where the indication information indicates the first reference signal sequence, or send indication information of the second reference signal sequence to the second device, where the indication information indicates the second reference signal sequence.

In a possible design, the first parameter includes at least one of a phase noise model of the communication apparatus, a phase noise power spectral density of the communication apparatus, a subcarrier spacing, a carrier frequency, a bandwidth of the communication apparatus, the modulation and coding scheme MCS of the communication apparatus, a modulation order of the communication apparatus, a channel parameter of the communication apparatus, the pattern of the first reference signal, an MCS threshold used to determine the pattern of the first reference signal, a bandwidth threshold used to determine the pattern of the first reference signal, and the like.

In a possible design, the first reference signal sequence is one of a QPSK pseudo-random sequence, a block sequence including a cyclic prefix and a cyclic suffix, a DMRS sequence, a block zero power sequence, a ZC sequence, and a block non-zero power sequence. The second reference signal sequence is one of a QPSK pseudo-random sequence and a DMRS sequence.

It should be noted that in this embodiment of this application, division of modules is an example, and is merely a logical function division. During actual implementation, there may be another division manner. In addition, functional units in embodiments of this application may be integrated into one processing unit, or may exist alone physically, or two or more than two units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the existing technology, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

Figure 9:
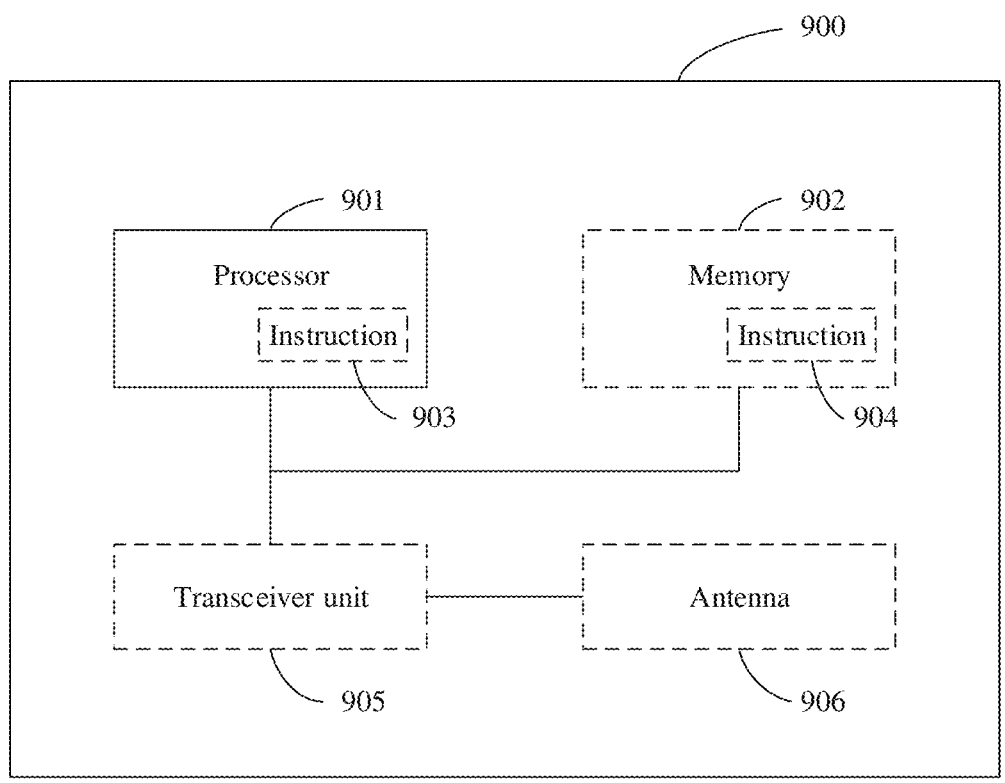
FIG. 9 is a schematic diagram of a structure of a communication apparatus according to this application.

Based on a same concept as the foregoing reference signal determining method, as shown in FIG. 9, an embodiment of this application further provides a communication apparatus 900. The communication apparatus 900 (referred to as an apparatus 900 for short below) may be configured to implement the method performed by the first device in the foregoing method embodiment. Refer to the descriptions in the foregoing method embodiment. The apparatus 900 may be a network device or a terminal device, may be located in the network device or the terminal device, or may be a transmit end device.

The apparatus 900 includes one or more processors 901. The processor 901 may be a general purpose processor, a dedicated processor, or the like. For example, the processor 901 may be a baseband processor or a central processing unit. The baseband processor may be configured to process a communication protocol and communication data. The central processing unit may be configured to control the communication apparatus (for example, a base station, a terminal, or a chip), execute a software program, and process data of the software program. The communication apparatus 900 may include a transceiver unit, configured to input (receive) and output (send) signals. For example, the transceiver unit may be a transceiver, a radio frequency chip, or the like.

The apparatus 900 includes one or more processors 901, and the one or more processors 901 may implement the method performed by the transmit end device or the first device in the foregoing embodiment.

Optionally, the processor 901 may further implement another function in addition to the method in the foregoing embodiment.

Optionally, in a design, the processor 901 may execute instructions, so that the apparatus 900 performs the reference signal determining method performed by the first device in the foregoing method embodiment. The instructions may be all or partially stored in the processor 901, for example, an instruction 903, or may be all or partially stored in a memory 902 coupled to the processor 901, for example, an instruction 904. Alternatively, the apparatus 900 may be enabled, by using both the instruction 903 and the instruction 904, to perform the method performed by the first device in the foregoing method embodiment.

In still another possible design, the communication apparatus 900 may alternatively include a circuit. The circuit may implement a function performed by the terminal device in the foregoing method embodiment.

In still another possible design, the apparatus 900 may include one or more memories 902, and the memories 902 store the instruction 904. The instruction may be run on the processor, to enable the apparatus 900 to perform the reference signal determining method described in the foregoing method embodiment. Optionally, the memory may further store data. Optionally, the processor may also store instructions and/or data. For example, the one or more memories 902 may store an association or a correspondence described in the foregoing embodiment, or a related parameter or table provided in the foregoing embodiment. The processor and the memory may be disposed separately, or may be integrated or coupled together.

In still another possible design, the apparatus 900 may further include a transceiver unit 905. The processor 901 may be referred to as a processing unit, and is configured to control the apparatus (the terminal or the base station). The transceiver unit 905 may be referred to as a transceiver machine, a transceiver circuit, a transceiver, or the like, and is configured to implement receiving and sending for the apparatus.

For example, if the apparatus 900 is a chip used in the terminal device, or another combined device, component, or the like that has a function of the foregoing terminal device, the apparatus 900 may include the transceiver unit 905.

In still another possible design, the apparatus 900 may further include a transceiver unit 905 and an antenna 906. The processor 901 may be referred to as a processing unit, and is configured to control the apparatus (the terminal or the base station). The transceiver unit 905 may be referred to as a transceiver machine, a transceiver circuit, a transceiver, or the like, and is configured to implement receiving and sending functions of the apparatus by using the antenna 906.

It should be noted that, the processor in this embodiment of this application may be an integrated circuit chip, and has a signal processing capability. In an implementation process, steps in the foregoing method embodiment can be implemented by using an integrated logical circuit of hardware in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware assembly. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing method in combination with hardware of the processor.

It may be understood that the memory in embodiments of this application may be a volatile memory or a non-volatile memory, or may include both the volatile memory and the non-volatile memory. The non-volatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through examples rather than limitative descriptions, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and method described in this specification includes but is not limited to these and any memory of another appropriate type.

An embodiment of this application further provides a computer-readable storage medium, storing a computer program. When the computer program is executed by a computer, the reference signal sequence determining method performed by the transmit end device or the first device in any one of the foregoing method embodiments is implemented.

An embodiment of this application further provides a computer program product. When the computer program product is executed by a computer, the reference signal sequence determining method performed by the transmit end device or the first device in any one of the foregoing method embodiments is implemented.

All or some of the foregoing embodiments may be implemented by using software, hardware, firmware, or any combination thereof. When being implemented by using the software, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, a solid-state drive (SSD)), or the like.

An embodiment of this application further provides a processing apparatus, including a processor and an interface. The processor is configured to perform the reference signal sequence determining method performed by the transmit end device or the first device in any one of the foregoing method embodiments.

It should be understood that the foregoing processing apparatus may be a chip. The processor may be implemented by using hardware, or may be implemented by using software. When the processor is implemented by using the hardware, the processor may be a logic circuit, an integrated circuit, or the like, or when the processor is implemented by using the software, the processor may be a general-purpose processor, and is implemented by reading software code stored in a memory. The memory may be integrated into the processor, or may be located outside the processor and exist independently.

Figure 6:
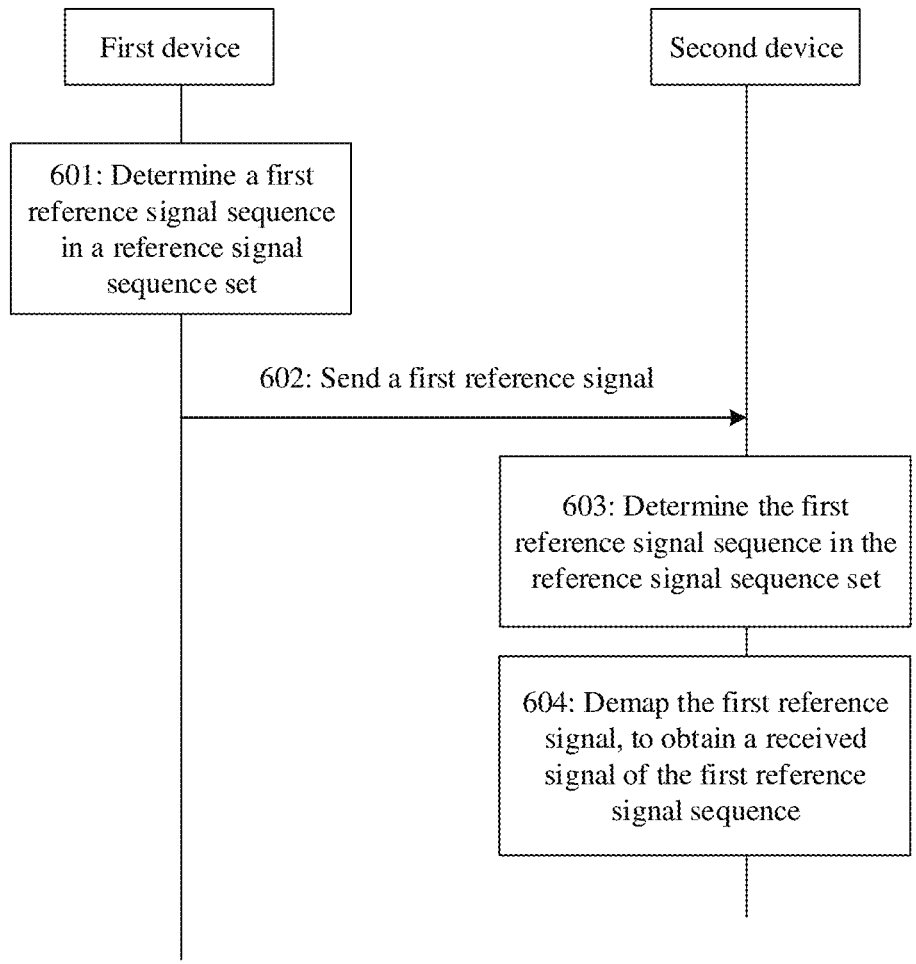
FIG. 6 is a schematic flowchart for determining a reference signal according to this application.
Figure 10:
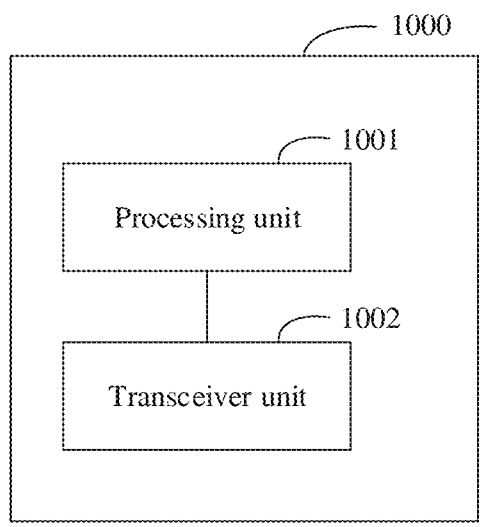
FIG. 10 is a schematic diagram of a structure of a communication apparatus according to this application.

The reference signal determining method provided in embodiments of this application is described in detail above with reference to FIG. 6. Based on a same inventive concept as the reference signal determining method, an embodiment of this application further provides a communication apparatus. As shown in FIG. 10, a communication apparatus 1000 includes a processing unit 1001 and a transceiver unit 1002. The communication apparatus 1000 (referred to as an apparatus 1000 for short below) may be configured to implement the method performed by the second device in the foregoing embodiment. The apparatus 1000 may be a network device or a terminal device, may be located in the network device or the terminal device, or may be the second device or a receive end device.

It should be noted that the apparatus 1000 may be a network device or a terminal device, or may be a chip used in the network device or the terminal device, or another combined device, component, or the like that has a function of the receive end device. When the apparatus is a network device or a terminal device, the transceiver unit may be a transceiver, which may include an antenna, a radio frequency circuit, and the like. The processing module may be a processor, for example, a central processing unit (CPU). When the apparatus 1000 is a component having a function of the network device or the terminal device, the transceiver unit may be a radio frequency unit, and the processing module may be a processor. When the apparatus 1000 is a chip system, the transceiver unit may be an input/output interface of the chip system, and the processing module may be a processor of the chip system.

In an embodiment, the apparatus 1000 may be configured to perform the steps performed by the second device in the foregoing method embodiment, or perform steps performed by the receive end device.

The transceiver unit 1002 is configured to receive a first reference signal from a first device. The processing unit 1001 is configured to determine a first reference signal sequence in a reference signal sequence set, and demap the first reference signal based on a first symbol sequence to which the first reference signal sequence is mapped, to obtain a received signal of the first reference signal sequence, where the reference signal sequence set includes at least a first-type reference signal sequence, a time-domain amplitude variance and/or a frequency-domain amplitude variance of the first-type reference signal sequence meet/ meets preset threshold/a preset threshold, the received signal of the first reference signal sequence is used by the communication apparatus to estimate impact of phase noise on the received signal, and the impact of the phase noise on the received signal includes at least one of inter-subcarrier interference, a common phase error, and the phase noise.

In a possible design, the processing unit 1001 is specifically configured to determine the first reference signal sequence in the reference signal sequence set based on a first parameter, where the first parameter includes at least one of a parameter for transmission between the first device and the communication apparatus, and a pattern of the first reference signal.

In a possible design, the reference signal sequence set includes a pi/2 BPSK reference signal sequence based on Golay complementary sequences. The processing unit 1001 is specifically configured to determine, if determining that the first parameter meets the following condition, that the first reference signal sequence is the pi/2 BPSK reference signal sequence based on the Golay complementary sequences: a size of a PTRS chunk is $2^a \times 10^b \times 26^c$, or a size of a corresponding chunk that is in a PTRS chunk and that is for carrying a valid sequence of the first reference signal sequence is $2^a \times 10^b \times 26^c$, where a, b, and c are integers.

In a possible design, the reference signal sequence set includes a ZC sequence. The processing unit 1001 is specifically configured to determine, if determining that the first parameter meets the following condition, that the first reference signal sequence is the ZC sequence: a size of a PTRS chunk is a prime number, or a size of a chunk that is in a PTRS chunk and that is for carrying a valid sequence of the first reference signal sequence is a prime number.

In a possible design, the reference signal sequence set includes a frequency-domain QPSK sequence with a stable amplitude in time domain and/or a time-domain QPSK sequence with a stable amplitude in frequency domain, where the frequency-domain QPSK sequence with the stable amplitude in time domain is one of P1 reference sequences that are selected from a frequency-domain QPSK sequence set based on a length Q of a valid sequence and whose time-domain amplitude variances meet a second threshold, and the time-domain QPSK sequence with the stable amplitude in frequency domain is one of P2 reference sequences that are selected from a time-domain QPSK sequence set based on the length Q of the valid sequence and whose frequency-domain amplitude variances meet a third threshold, where P1 and P2 are positive integers.

The processing unit 1001 is specifically configured to determine, if determining that the first parameter meets the following condition, that the first reference signal sequence is the frequency-domain QPSK sequence with the stable amplitude in time domain and/or the time-domain QPSK sequence with the stable amplitude in frequency domain: a size M of a PTRS chunk included in the pattern of the first reference signal is greater than or equal to a first threshold, or a size M of a corresponding chunk that is in a PTRS chunk included in the pattern of the first reference signal and that is for carrying a valid sequence of the first reference signal sequence is greater than or equal to a first threshold, where M and L are positive integers.

In a possible design, the processing unit 1001 is further configured to determine a power boosting value of the communication apparatus based on the size of the PTRS chunk in the pattern of the first reference signal, or determine that a power boosting value of the communication apparatus is a fixed value.

In a possible design, the reference signal sequence set further includes a second-type reference signal sequence, and the second-type reference signal sequence is a discrete reference signal sequence. The transceiver unit 1002 is further configured to receive a second reference signal from the first device. The processing unit 1001 is further configured to determine a second reference signal sequence in the second-type reference signal sequence based on the first parameter, and demap the second reference signal based on a second symbol sequence to which the second reference signal sequence is mapped, to obtain a received signal of the second reference signal sequence, where a size of a PTRS chunk included in a pattern of the second reference signal sequence is 1, the second reference signal sequence is used by the second device to estimate impact of phase noise on the received signal, the impact of the phase noise on the received signal includes at least one of inter-subcarrier interference, a common phase error, and the phase noise, and the first parameter further includes at least one of a pattern of the second reference signal, an MCS threshold used to determine the pattern of the second reference signal, and a bandwidth threshold used to determine the pattern of the second reference signal.

In a possible design, the processing unit 1001 is further configured to determine the first reference signal sequence based on an association relationship between the first parameter and the first reference signal sequence, or determine the second reference signal sequence based on an association relationship between the first parameter and the second reference signal sequence.

In a possible design, the transceiver unit 1002 is further configured to receive indication information of the first reference signal sequence from the second device, where the indication information of the first reference signal sequence indicates the first reference signal sequence, or receive indication information of the second reference signal sequence from the second device, where the indication information of the second reference signal sequence indicates the second reference signal sequence.

In a possible design, the processing unit 1001 is further configured to determine the power boosting value of the communication apparatus based on an MCS of the communication apparatus, or determine that the power boosting value of the communication apparatus is a fixed value.

In a possible design, the processing unit 1001 is specifically configured to, if determining that the MCS of the communication apparatus is greater than or equal to a first MCS threshold, determine that the power boosting value is 0 dB, or if determining that the MCS of the communication apparatus is less than a first MCS threshold, determine the power boosting value based on a quantity of demodulation reference signal DMRS ports associated with a phase noise estimation reference signal PTRS port.

In a possible design, the processing unit 1001 is specifically configured to, if determining that the MCS of the communication apparatus is greater than a first MCS threshold, determine that the power boosting value is 0 dB, or if determining that the MCS of the communication apparatus is less than or equal to a first MCS threshold, determine the power boosting value based on a quantity of demodulation reference signal DMRS ports associated with a phase noise estimation reference signal PTRS port.

In a possible design, the first parameter includes at least one of a phase noise model of the communication apparatus, a phase noise power spectral density of the communication apparatus, a subcarrier spacing, a carrier frequency, a bandwidth of the communication apparatus, the modulation and coding scheme MCS of the communication apparatus, a modulation order of the communication apparatus, a channel parameter of the communication apparatus, the pattern of the first reference signal, an MCS threshold used to determine the pattern of the first reference signal, a bandwidth threshold used to determine the pattern of the first reference signal, and the like.

In a possible design, the first reference signal sequence is one of a QPSK pseudo-random sequence, a block sequence including a cyclic prefix and a cyclic suffix, a DMRS sequence, a block zero power sequence, a ZC sequence, and a block non-zero power sequence. The second reference signal sequence is one of a QPSK pseudo-random sequence and a DMRS sequence.

It should be noted that in this embodiment of this application, division of modules is an example, and is merely a logical function division. During actual implementation, there may be another division manner. In addition, functional units in embodiments of this application may be integrated into one processing unit, or may exist alone physically, or two or more than two units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the existing technology, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

Figure 11:
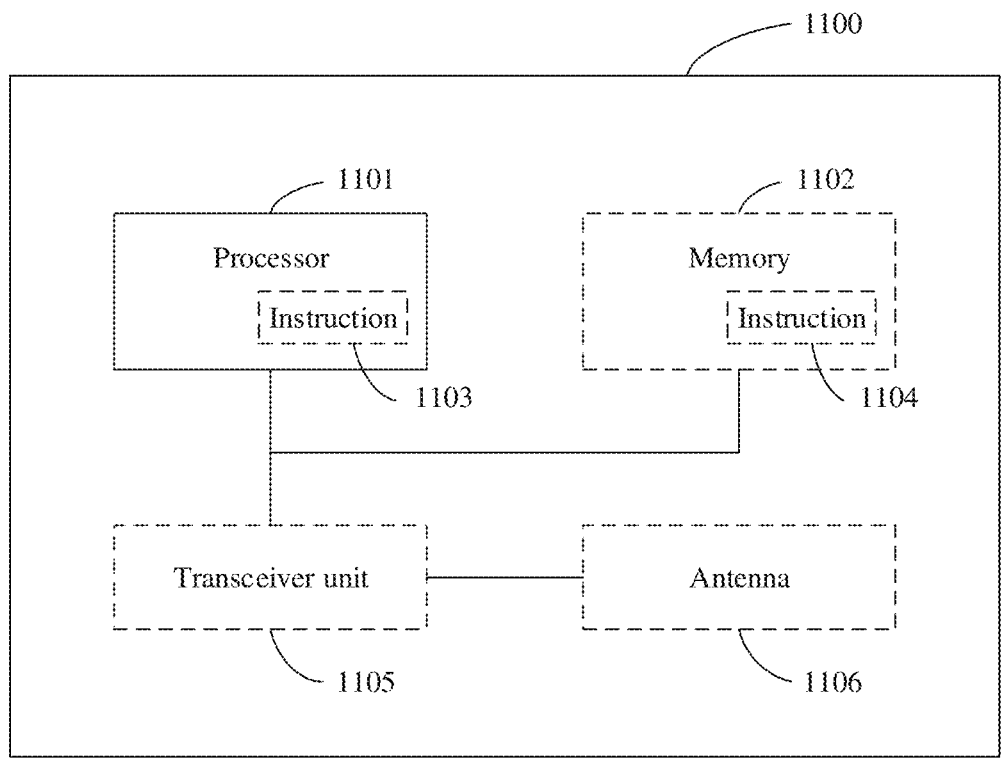
FIG. 11 is a schematic diagram of a structure of a communication apparatus according to this application.

Based on a same concept as the foregoing reference signal determining method, as shown in FIG. 11, an embodiment of this application further provides a communication apparatus 1100. The apparatus 1100 may be configured to implement the method performed by the second device in the foregoing method embodiment. Refer to the descriptions in the foregoing method embodiment. The apparatus 1100 may be located in the second device or a receive end device, or may be a network device or a terminal device.

The apparatus 1100 includes one or more processors 1101. The processor 1101 may be a general-purpose processor, a dedicated processor, or the like. For example, the processor 1101 may be a baseband processor or a central processing unit. The baseband processor may be configured to process a communication protocol and communication data. The central processing unit may be configured to control the communication apparatus (for example, a base station, a terminal, or a chip), execute a software program, and process data of the software program. The communication apparatus 1100 may include a transceiver unit, configured to input (receive) and output (send) signals. For example, the transceiver unit may be a transceiver, a radio frequency chip, or the like.

The apparatus 1100 includes one or more processors 1101, and the one or more processors 1101 may implement the method performed by the second device or the receive end device in the foregoing embodiment.

Optionally, the processor 1101 may further implement another function in addition to the method in the foregoing embodiment.

Optionally, in a design, the processor 1101 may execute instructions, so that the apparatus 1100 performs the reference signal determining method performed by the second device in the foregoing method embodiment. The instructions may be all or partially stored in the processor, for example, an instruction 1103, or may be all or partially stored in a memory 1102 coupled to the processor 1101, for example, an instruction 1104. Alternatively, the apparatus 1100 may be enabled, by using both the instruction 1103 and the instruction 1104, to perform the reference signal determining method performed by the second device described in the foregoing method embodiment.

In still another possible design, the communication apparatus 1100 may alternatively include a circuit. The circuit may implement a function performed by the terminal device in the foregoing method embodiment.

In still another possible design, the apparatus 1100 may include one or more memories 1102, and the memories 1102 store the instruction 1104. The instruction may be run on the processor, to enable the apparatus 1100 to perform the reference signal determining method described in the foregoing method embodiment. Optionally, the memory may further store data. Optionally, the processor may also store instructions and/or data. For example, the one or more memories 1102 may store an association or a correspondence described in the foregoing embodiment, or a related parameter or table provided in the foregoing embodiment. The processor and the memory may be disposed separately, or may be integrated or coupled together.

In still another possible design, the apparatus 1100 may further include a transceiver unit 1105. The processor 1101 may be referred to as a processing unit, and is configured to control the apparatus (the terminal or the base station). The transceiver unit 1105 may be referred to as a transceiver machine, a transceiver circuit, a transceiver, or the like, and is configured to implement receiving and sending for the apparatus.

For example, if the apparatus 1100 is a chip used in the network device or the terminal device, or another combined device, component, or the like that has a function of the foregoing network device or terminal device, the apparatus 1100 may include the transceiver unit 1105.

In still another possible design, the apparatus 1100 may further include a transceiver unit 1105 and an antenna 1106. The processor 1101 may be referred to as a processing unit, and is configured to control the apparatus (the terminal or the base station). The transceiver unit 1105 may be referred to as a transceiver machine, a transceiver circuit, a transceiver, or the like, and is configured to implement receiving and sending functions of the apparatus by using the antenna 1106.

It should be noted that, the processor in this embodiment of this application may be an integrated circuit chip, and has a signal processing capability. In an implementation process, steps in the foregoing method embodiment can be implemented by using an integrated logical circuit of hardware in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware assembly. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing method in combination with hardware of the processor.

It may be understood that the memory in embodiments of this application may be a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through examples rather than limitative descriptions, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and method described in this specification includes but is not limited to these and any memory of another appropriate type.

An embodiment of this application further provides a computer-readable storage medium, storing a computer program. When the computer program is executed by a computer, the reference signal determining method performed by the receive end device or the second device in any one of the foregoing method embodiments is implemented.

An embodiment of this application further provides a computer program product. When the computer program product is executed by a computer, the reference signal determining method performed by the receive end device or the second device in any one of the foregoing method embodiments is implemented.

All or some of the foregoing embodiments may be implemented by using software, hardware, firmware, or any combination thereof. When being implemented by using the software, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, a solid-state drive (SSD)), or the like.

An embodiment of this application further provides a processing apparatus, including a processor and an interface. The processor is configured to perform the reference signal determining method performed by the receive end device or the second device in any one of the foregoing method embodiments.

It should be understood that the foregoing processing apparatus may be a chip. The processor may be implemented by using hardware, or may be implemented by using software. When the processor is implemented by using the hardware, the processor may be a logic circuit, an integrated circuit, or the like, or when the processor is implemented by using the software, the processor may be a general-purpose processor, and is implemented by reading software code stored in a memory. The memory may be integrated into the processor, or may be located outside the processor and exist independently.

A person of ordinary skill in the art may be aware that, in combination with the examples described in the embodiments disclosed in this specification, units and method steps may be implemented by electronic hardware, computer software, or a combination thereof. To clearly describe the interchangeability between the hardware and the software, the foregoing has generally described compositions and steps of the examples based on functions. Whether the functions are performed by hardware or software depends on particular applications and design constraints of the technical solutions. A person skilled in the art may use different methods to implement the described functions for each particular application, but it should not be considered that the implementation goes beyond the protection scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. A part or all of the units may be selected based on actual requirements to achieve the solutions and the objectives of embodiments of this application.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

According to the descriptions of the foregoing implementations, a person skilled in the art can clearly understand that this application can be implemented by using hardware, software, firmware, or a combination thereof. When this application is implemented by using the software, the foregoing functions may be stored in a computer-readable storage medium or transmitted as one or more instructions or code in the computer-readable storage medium. The computer-readable storage medium includes a computer storage medium and a communication medium. The communication medium includes any medium that enables a computer program to be transmitted from one place to another. The computer storage medium may be any available medium accessible to a computer. The following provides an example but does not impose a limitation. The computer-readable storage medium may include a RAM, a ROM, an EEPROM, a CD-ROM or another compact disc storage, a magnetic disk storage medium or another magnetic storage device, or any other medium that can be for carrying or store expected program code in a form of an instruction or a data structure and can be accessed by the computer. In addition, any connection may also be appropriately defined as a computer-readable medium. For example, if software is transmitted from a website, a server, or another remote source by using a coaxial cable, an optical fiber cable, a twisted pair, a digital subscriber line (DSL), or wireless technologies such as infrared ray, radio and microwave, the coaxial cable, optical fiber cable, twisted pair, DSL, or wireless technologies such as infrared ray, radio and microwave are included in fixation of a medium to which they belong. For example, a disk (Disk) used in this application include a compact disc (CD), a laser disc, an optical disc, a digital versatile disc (DVD), a floppy disk, and a Blu-ray disc. The disk may usually use magnetism to copy data, and the disc may use lasers to copy data. The foregoing combination shall also be included in the protection scope of the computer-readable storage medium.

In conclusion, what are described above are merely examples of embodiments of the technical solutions provided in this application, but are not intended to limit the protection scope of this application. Any modification, equivalent replacement, or improvement made without departing from the spirit and principle of this application shall fall within the protection scope of this application.

What is claimed is:

1. A reference signal determining method, comprising:
   determining, by a first device, a first reference signal sequence in a reference signal sequence set, wherein a second device estimates impact of phase noise on a received signal based on the reference signal sequence, and the impact of the phase noise on the received signal comprises at least one of inter-subcarrier interference, a common phase error, and the phase noise, wherein the reference signal sequence set comprises at least a first-type reference signal sequence, and wherein a time-domain amplitude variance and a frequency-domain amplitude variance of the first-type reference signal sequence each meet a preset threshold;
   mapping, by the first device, the first reference signal sequence to a first symbol sequence; and
   sending, by the first device, a first reference signal corresponding to the first reference signal sequence to the second device based on the first symbol sequence.

2. The method according to claim 1, wherein determining, by a first device, a first reference signal sequence in a reference signal sequence set comprises:
   determining, by the first device, the first reference signal sequence in the reference signal sequence set based on a first parameter, wherein the first parameter comprises at least one of the following:
   a hardware capability of the first device;
   a hardware capability of the second device;
   a parameter for transmission between the first device and the second device; and
   a phase tracking reference signal (PTRS) parameter of the second device.

3. The method according to claim 2, wherein the reference signal sequence set comprises a pi/2 binary phase shift key (BPSK) reference signal sequence based on Golay complementary sequences; and
   wherein determining, by the first device if determining that a size of a PTRS chunk comprised in a pattern of the first reference signal is greater than 1 and less than or equal to a first threshold, that the first reference signal sequence is a block reference signal sequence comprises:
   determining, by the first device, that the first reference signal sequence is the pi/2 BPSK reference signal sequence based on the Golay complementary sequences, if determining that the first parameter meets one of the following conditions:
   the size of the PTRS chunk is $2^a \times 10^b \times 26^c$; or
   a size of a corresponding chunk that is in the PTRS chunk and that is for carrying a valid sequence of the first reference signal sequence is $2^a \times 10^b \times 26^c$, wherein a, b, and c are integers.

4. The method according to claim 2, wherein the reference signal sequence set comprises a Zadoff-chu (ZC) sequence, and wherein determining, by the first device if determining that a size of a PTRS chunk comprised in a pattern of the first reference signal is greater than 1 and less than or equal to a first threshold, that the first reference signal sequence is a block reference signal sequence comprises:
   determining, by the first device, that the first reference signal sequence is the ZC sequence, if the first device determines that the first parameter meets one of the following conditions:
   the size of the PTRS chunk is a prime number; or
   a size of a chunk that is in the PTRS chunk and that is for carrying a valid sequence of the first reference signal sequence is a prime number.

5. The method according to claim 2, wherein the reference signal sequence set comprises at least one of:
   a frequency-domain quadrature phase shift key (QPSK) sequence with a stable amplitude in time domain; and
   a time-domain QPSK sequence with a stable amplitude in frequency domain;
   wherein the frequency-domain QPSK sequence with the stable amplitude in time domain is one of P1 reference sequences that are selected from a frequency-domain QPSK sequence set based on a length Q of a valid sequence and whose time-domain amplitude variances meet a second threshold, and the time-domain QPSK sequence with the stable amplitude in frequency domain is one of P2 reference sequences that are selected from a time-domain QPSK sequence set based on the length Q of the valid sequence and whose frequency-domain amplitude variances meet a third threshold, wherein P1 and P2 are positive integers; and
   wherein determining, by the first device, the first reference signal sequence in the reference signal sequence set based on a first parameter comprises:
   determining, by the first device, that the first reference signal sequence is the frequency-domain QPSK sequence with the stable amplitude in time domain and/or the time-domain QPSK sequence with the stable amplitude in frequency domain, if the first device determines that the first parameter meets at least one of the following conditions:
   a size M of a PTRS chunk comprised in a pattern of the first reference signal is greater than or equal to a first threshold;
   a size M of a corresponding chunk that is comprised in a PTRS chunk comprised in a pattern of the first reference signal and that is for carrying a valid sequence of the first reference signal sequence is greater than or equal to a first threshold; and
   M is an integer multiple of L, wherein L is a quantity of resource elements REs comprised in one resource block RB, and M and L are positive integers.

6. The method according to claim 2, wherein the method further comprises at least one of:
   determining, by the first device, a power boosting value of the second device based on a size of a PTRS chunk in a pattern of the first reference signal; and
   determining, by the first device, that the power boosting value of the second device is a fixed value.

7. The method according to claim 1, wherein the reference signal sequence set further comprises a second-type reference signal sequence, wherein the second-type reference signal sequence is a discrete reference signal sequence, and wherein the method further comprises:
   determining, by the first device, a second reference signal sequence in the second-type reference signal sequence based on a first parameter, wherein the second reference signal sequence indicates an estimated impact of phase noise of the second device on a received signal, and the impact of the phase noise on the received signal comprises at least one of inter-subcarrier interference, a common phase error, and the phase noise;

mapping, by the first device, the second reference signal sequence to a second symbol sequence; and sending, by the first device, a second reference signal corresponding to the second reference signal sequence to the second device based on the second symbol sequence;

wherein a size of a phase tracking reference signal (PTRS) chunk comprised in a pattern of the second reference signal sequence is 1, and wherein the first parameter further comprises at least one of a pattern of the second reference signal, a modulation and coding scheme (MCS) threshold used to determine the pattern of the second reference signal, and a bandwidth threshold used to determine the pattern of the second reference signal.

8. The method according to claim 7, wherein the method further comprises at least one of the following:

determining, based on an MCS of the second device, a power boosting value of the second reference signal sequence; and determining the power boosting value of the second device is a fixed value.

9. The method according to claim 8, wherein determining, based on an MCS of the second device, a power boosting value of the second reference signal sequence comprises performing one of the following:

determining, by the first device, if the MCS of the second device is greater than or equal to a first MCS threshold, and performing one of the following:

determining, based on determining that the MCS of the second device is greater than or equal to the first MCS threshold, the power boosting value of the second device is 0 dB; or determining, based on determining that the MCS of the second device is less than a first MCS threshold, the power boosting value of the second device based on a quantity of demodulation reference signal (DMRS) ports associated with a PTRS port; or determining, by the first device, if the MCS of the second device is greater than a first MCS threshold, and performing one of the following:

determining, based on determining that the MCS of the second device is greater than a first MCS threshold, the power boosting value of the second device is 0 dB; or determining, based on determining that the MCS of the second device is less than or equal to a first MCS threshold, the power boosting value of the second device based on a quantity of DMRS ports associated with a PTRS port.

10. A communication apparatus, comprising a processor and a transceiver, wherein the processor is configured to determine a first reference signal sequence in a reference signal sequence set, wherein a second device estimates an impact of phase noise on a received signal based on the first reference signal sequence, wherein the impact of the phase noise on the received signal comprises at least one of inter-subcarrier interference, a common phase error, and the phase noise, wherein the reference signal sequence set comprises at least a first-type reference signal sequence, and wherein a time-domain amplitude variance or a frequency-domain amplitude variance of the first-type reference signal sequence meets a preset threshold; and the transceiver is configured to: map the first reference signal sequence to a first symbol sequence, and send a first reference signal corresponding to the first reference signal sequence to the second device.

11. The communication apparatus according to claim 10, wherein the processor is further configured to determine the first reference signal sequence in the reference signal sequence set based on a first parameter, wherein the first parameter comprises at least one of a parameter for transmission between the communication apparatus and the second device, and a pattern of the first reference signal.

12. The communication apparatus according to claim 11, wherein the reference signal sequence set comprises a pi/2 binary phase shift key (BPSK) reference signal sequence based on Golay complementary sequences; and wherein the processor is further configured to determine, if determining that the first parameter meets the following condition, that the first reference signal sequence is the pi/2 BPSK reference signal sequence based on the Golay complementary sequences: a size of a PTRS chunk is $2^a \times 10^b \times 26^c$, or a size of a corresponding chunk that is in a phase tracking reference signal (PTRS) chunk and that carries a valid sequence of the first reference signal sequence is $2^a \times 10^b \times 26^c$, wherein a, b, and c are integers.

13. The communication apparatus according to claim 11, wherein the reference signal sequence set comprises a Zadoff-Chu (ZC) sequence; and wherein the processor is further configured to determine that the first reference signal sequence is the ZC sequence, if determining that the first parameter meets one of the following conditions:

a size of a phase tracking reference signal (PTRS) chunk is a prime number; or a size of a chunk that is in the PTRS chunk and that is for carrying a valid sequence of the first reference signal sequence is a prime number.

14. The communication apparatus according to claim 11, wherein the reference signal sequence set comprises at least one of a frequency-domain quadrature phase shift key (QPSK) sequence with a stable amplitude in time domain and a time-domain QPSK sequence with a stable amplitude in frequency domain;

wherein the frequency-domain QPSK sequence with the stable amplitude in time domain is one of P1 reference sequences that are selected from a frequency-domain QPSK sequence set based on a length Q of a valid sequence and whose time-domain amplitude variances meet a second threshold, and wherein the time-domain QPSK sequence with the stable amplitude in frequency domain is one of P2 reference sequences that are selected from a time-domain QPSK sequence set based on the length Q of the valid sequence and whose frequency-domain amplitude variances meet a third threshold, wherein P1 and P2 are positive integers; and wherein the processor is further configured to:

determine if the first parameter meets at least one of the following conditions:

the first reference signal sequence is the frequency-domain QPSK sequence with the stable amplitude in time domain; and the time-domain QPSK sequence with the stable amplitude in frequency domain; and determine, if the first parameter meets at least one of the previous conditions, a size M of a phase tracking reference signal (PTRS) chunk comprised in the pattern of the first reference signal is greater than or equal to a first threshold, or a size M of a corresponding chunk that is in a PTRS chunk comprised in the pattern of the first reference signal and that is for carrying a valid sequence of the first reference signal sequence is greater than or equal to a first threshold.

15. The communication apparatus according to claim 11, wherein the processor is further configured to: if determining that the first reference signal sequence is a block non-zero power sequence, determine a power boosting value of the second device based on a size of a phase tracking reference signal (PTRS) chunk in the pattern of the first reference signal; or the processor is further configured to determine that a power boosting value of the first reference signal sequence is a fixed value.

16. The communication apparatus according to claim 10, wherein the reference signal sequence set further comprises a second-type reference signal sequence, wherein the second-type reference signal sequence is a discrete reference signal sequence;
wherein the processor is further configured to determine a second reference signal sequence in the second-type reference signal sequence based on a first parameter, wherein a size of a phase tracking reference signal (PTRS) chunk comprised in a pattern of the second reference signal sequence is 1, wherein the second device estimates an impact of phase noise on a received signal based on the second reference signal sequence, and wherein the impact of the phase noise on the received signal comprises at least one of inter-subcarrier interference, a common phase error, and phase noise; and
wherein the transceiver is further configured to:
map the second reference signal sequence to a second symbol sequence; and
send a second reference signal corresponding to the second reference signal sequence to the second device, wherein the first parameter further comprises at least one of the following:
a pattern of the second reference signal, a modulation and coding scheme (MCS) threshold used to determine the pattern of the second reference signal, and a bandwidth threshold used to determine the pattern of the second reference signal.

17. The communication apparatus according to claim 16, wherein the processor is further configured to determine a power boosting value of the second device based on an MCS of the second device.

18. The communication apparatus according to claim 17, wherein the processor is further configured to perform one of the following:
determining if the MCS of the second device is greater than or equal to a first MCS threshold, and performing one of the following:
determine, based on the MCS of the second device being greater than or equal to a first MCS threshold, the power boosting value of the second device is 0 dB; or
determine, based on the MCS of the second device being less than a first MCS threshold, the power boosting value of the second device based on a quantity of demodulation reference signal (DMRS) ports associated with a PTRS port of the second device; or
determining if the MCS of the second device is greater than a first MCS threshold, and performing one of the following:
determine, based on the MCS of the second device being greater than a first MCS threshold, the power boosting value of the second device is 0 dB; or
determine, based on the MCS of the second device being less than or equal to a first MCS threshold, power boosting value of the second device based on a quantity of DMRS ports associated with a PTRS port of the second device.

19. A non-transitory computer-readable storage medium storing a program to be executed by a processor, the program including instructions for:
determining, by a first device, a first reference signal sequence in a reference signal sequence set, wherein a second device estimates impact of phase noise on a received signal based on the reference signal sequence, and the impact of the phase noise on the received signal comprises at least one of inter-subcarrier interference, a common phase error, and the phase noise, wherein the reference signal sequence set comprises at least a first-type reference signal sequence, and wherein a time-domain amplitude variance and a frequency-domain amplitude variance of the first-type reference signal sequence each meet a preset threshold;
mapping, by the first device, the first reference signal sequence to a first symbol sequence; and
sending, by the first device, a first reference signal corresponding to the first reference signal sequence to the second device based on the first symbol sequence.

* * * * *